(12) United States Patent
Faeldt et al.

(10) Patent No.: US 7,848,888 B2
(45) Date of Patent: Dec. 7, 2010

(54) METHOD FOR IDENTIFICATION OF BIOLOGICALLY ACTIVE AGENTS

(75) Inventors: Edward Faeldt, Backefors (SE); Luis Serrano, Heidelberg (DE); Cayetano Gonzalez, Madrid (ES); Christian Boulin, Weisloch (DE); Christopher J. Cummings, Brookline, MA (US); Juan Botas, Houston, TX (US); Huda Zoghbi, Houston, TX (US)

(73) Assignees: Vitruvean LLC, Watertown, MA (US); Baylor College of Medicine, Houston, TX (US); European Molecular Biology Laboratory, Heidelberg (DE)

( * ) Notice: Subject to any disclaimer, the term of this patent is extended or adjusted under 35 U.S.C. 154(b) by 78 days.

(21) Appl. No.: 10/618,913

(22) Filed: Jul. 14, 2003

(65) Prior Publication Data

US 2004/0076583 A1 Apr. 22, 2004

Related U.S. Application Data

(60) Provisional application No. 60/396,339, filed on Jul. 15, 2002.

(51) Int. Cl.
*C12Q 1/68* (2006.01)
*G01N 33/48* (2006.01)

(52) U.S. Cl. ................. 702/19; 435/6; 702/20

(58) Field of Classification Search ............. None
See application file for complete search history.

(56) References Cited

U.S. PATENT DOCUMENTS

| | | | | |
|---|---|---|---|---|
| 5,716,831 | A | 2/1998 | Whalon et al. | 435/19 |
| 6,500,617 | B1 | 12/2002 | Stemmer et al. | 435/6 |
| 2003/0028327 | A1* | 2/2003 | Brunner et al. | 702/19 |
| 2004/0177388 | A1* | 9/2004 | Botas et al. | 800/8 |

OTHER PUBLICATIONS

Bainton, Curr. Biol., 10:187-194 (2000).*
Hendricks, Neuron, 25:129-138 (2000).*
Roberts et al., Journal of Leukocyte Biology, vol. 68, pp. 627-632, Nov. 2000.*
Ciesla, et al.; "Mapping Effectiveness of Insecticide Treatments against Pandora Moth with Color-IR Photos"; (1984); vol. 50, No. 1, pp. 73-79.
International Search Report for PCT/US03/22033, mailed Feb. 23, 2004.
Chan and Bonini; "Drosophila models of human neurodegenerative disease"; (2000); *Cell Death and Differentiation*; 7: 1075-1080.
Feany and Bender; "A Drosophila model of Parkinson's disease"; (2000); *Nature*; 404: 394-398.
Fernandez-Funez, et al.; "Identification of genes that modify ataxin-1-induced neurodegeneration"; (2000); *Nature*; 408: 101-106.
Fortini and Bonini; "Modeling human neurodegenerative diseases in Drosophila"; (2000); *Trends Genet.*; 16: 161-167.
Jackson, et al.; "Polyglutamine-Expanded Human Huntington Transgenes Induce Degeneration of Drosophila Photoreceptor Neurons"; (1998); *Neuron*; 21: 633-642.
Kazemi-Esfarjani and Benzer; "Genetic Suppression of Polyglutamine Toxicity in Drosophila"; (2000); *Science*; 287: 1837-1840.
Warrick, et al.; "Expanded Polyglutamine Protein Forms Nuclear Inclusions and Causes Neural Degeneration in Drosophila"; (1998); *Cell*; 93: 939-949.
Brand and Perrimon; "Targeted gene expression as a means of altering cell fates and generating dominant phenotypes"; (1993); *Development*; 118: 401-415.
Marsh, et al.; Expanded polyglutamine peptides alone are intrinsically cytotoxic and cause neurodegeneration in Drosophila; (2000); *Hum. Mol. Genet.*; 9: 13-25.

* cited by examiner

*Primary Examiner*—Shubo (Joe) Zhou
(74) *Attorney, Agent, or Firm*—Edwards Angell Palmer & Dodge LLP; Elizabeth Spar; Kathleen Williams

(57) ABSTRACT

The present invention provides a method for screening for the effect of a test agent on a population of biological specimens, preferably insects, comprising the steps of providing a population of specimens, administering at least one test agent to the population, creating a digitized movie showing the movements of members of the population, measuring at least one trait of members of the population, and correlating the traits of the population with the effect of the test agent. The invention also provides a method for preparing a medicament useful for the treatment of a mammalian disease.

35 Claims, 17 Drawing Sheets

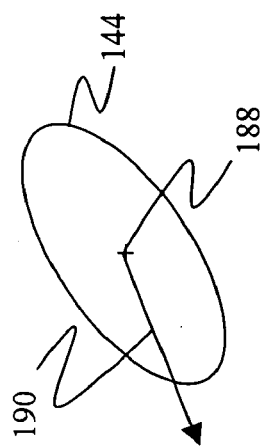
Fig. 10
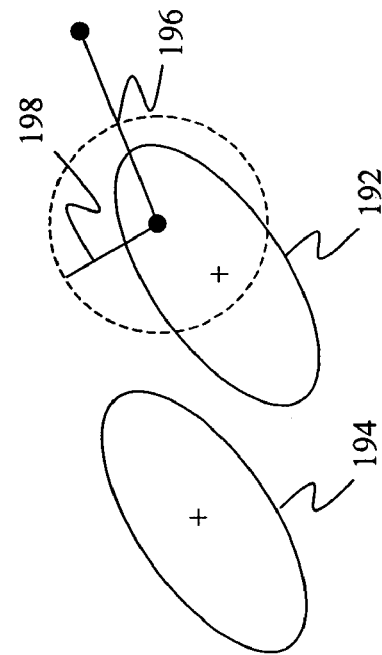
Fig. 11A
Fig. 11B
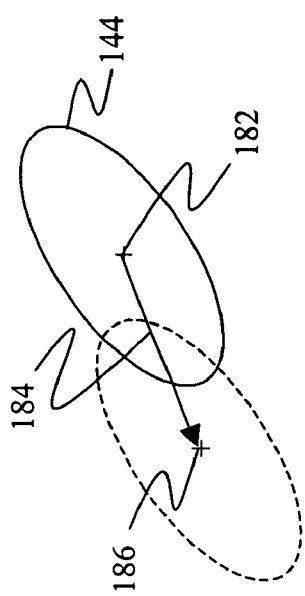
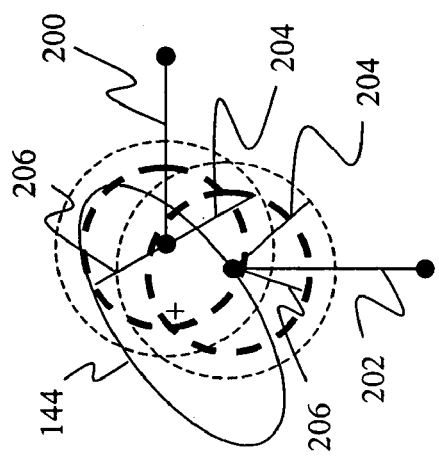
Fig. 12

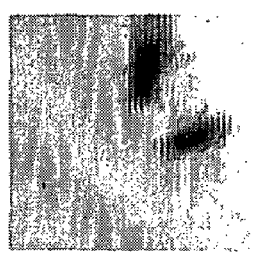 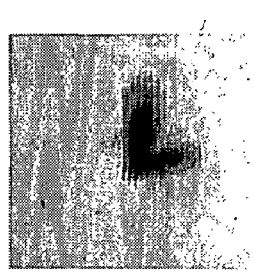 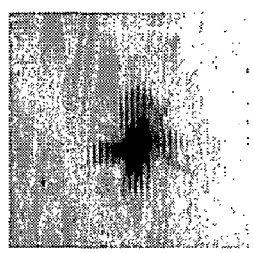 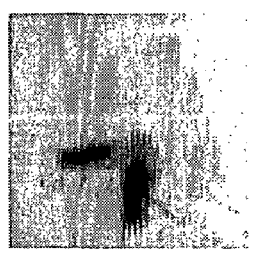 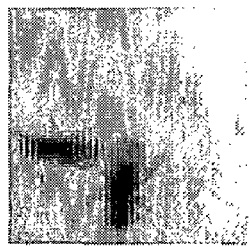
Fig. 13A  Fig. 13B  Fig. 13C  Fig. 13D  Fig. 13E
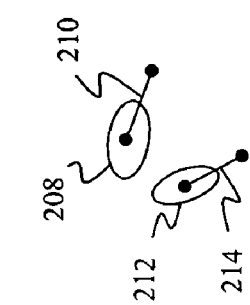 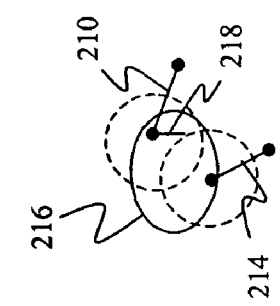 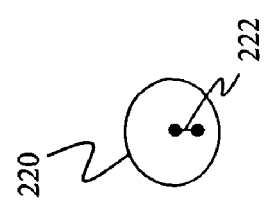  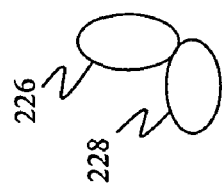
Fig. 14A  Fig. 14B  Fig. 14C  Fig. 14D  Fig. 14E

METHOD FOR IDENTIFICATION OF BIOLOGICALLY ACTIVE AGENTS

PRIORITY

This application claims priority to U.S. Provisional Application Ser. No. 60/396,339, filed Jul. 15, 2002, the contents of which are incorporated herein in their entirety.

BACKGROUND OF THE INVENTION

Neurodegenerative diseases are among some of the most devastating diseases afflicting humans. Examples of neurodegenerative diseases include Alzheimer's Disease, Parkinson's Disease, Huntington's Disease and spinocerebellar ataxia (SCA). However, the discovery and development of therapeutics for disorders of the central nervous system (CNS), particularly for neurodegenerative diseases, has historically been very difficult.

The investigation of pathogenic mechanisms in neurodegenerative disease has been facilitated by the recent development of disease models in *Drosophila*. By introducing human disease genes with dominant gain-of-function mutations into *Drosophila*, models for a number of neurodegenerative diseases have been generated, including models for Huntington's disease and spinocerebellar ataxia (see, for example, Chan et al. (2000) *Cell Death Differ.* 7:1075-1080; Feany et al. (2000) *Nature* 404:394-398; Femandez-Funez et al. (2000) *Nature* 408:101-106; Fortini et al. (2000) *Trends Genet.* 16:161-167; Jackson et al. (1998) *Neuron* 21:633-642; Kazemi-Esfarjani et al. (2000) *Science* 287:1837-1840; Warrick et al. (1998) *Cell* 93:939-949. Specific cell or tissue expression can be achieved by placing the human gene under control of the GAL4/UAS transcriptional activation system from yeast (Brand et al. (1993) *Development* 118:401-415). Due to the ease with which genetic studies can be pursued in *Drosophila*, these models have been especially useful in identifying genes that modify the disease.

In some cases, expression of the transgene recapitulates one or more neuropathological features of the human disease. For example, in a *Drosophila* model for Parkinson's disease produced by neuronal expression of human mutated alpha-synuclein, age-dependent, progressive degeneration of dopamine-containing cells is seen accompanied by the presence of Lewy bodies that resemble those seen in the human disease, both by their immunoreactivity for alpha-synuclein and by their appearance in the electron microscope (Feany et al. (2000)). In the SCA1$^{82Q}$ flies, expression of the mutated human ataxin-1 (associated with SCA) is accompanied by adult-onset degeneration of neurons, with nuclear inclusions that are immunologically positive for the mutated protein, ubiquitin, Hsp70 and proteosome components (Fernandez-Funez et al. (2000)). In the case of Huntington's disease, expression of exon-1 of huntingtin, containing an expanded polyglutamine repeat, causes a progressive degeneration, whose time of onset and severity are linked to the length of the repeat, as is seen in the human disease (Marsh et al. (2000) *Hum. Mol. Genet.* 9:13-25).

Although great advances have been made in understanding the biological basis of neurological disorders, this scientific progress has generally not yet been translated into effective new treatments for these devastating disorders. There remains a tremendous need for new methods of drug discovery for CNS disorders, particularly for neurodegenerative diseases.

SUMMARY OF THE INVENTION

In one aspect, the invention provides methods for screening for the effects of a test agent on a population of animals which entail providing a population of animals, administering at least one test agent to the population, creating a digitized movie showing movement of animals in the population, determining at least one trait, optionally at least two traits of the population, and correlating the traits of the population with the effect of the test agent(s) administered to the population. In one embodiment, the invention provides methods for screening for the effects of a test agent on a population of animals which entail providing a plurality of populations of animals, administering at least one test agent to each of the populations, creating a digitized movie showing movement of animals in each population, determining at least two traits of each population and, for each population, correlating the traits of the population with the effect of the test agent(s) administered to the population.

Another aspect of the invention provides methods for ranking test agents which entail providing a plurality of populations of animals, contacting each of the populations with a different test agent, measuring at least one trait, optionally at least two traits, for each of these population to produce an agent phenoprofile and ranking the test agents according to the similarity or difference of each agent phenoprofile with a reference phenoprofile defined by the at least one or at least two traits as exhibited in a reference population of animals.

In another aspect, the invention provides methods of screening for an agent with a desired biological activity which entail: providing a plurality of populations of animals; contacting each of the populations with a different test agent; determining an agent phenoprofile for each of these populations, wherein the agent phenoprofile comprises a quantitative description of one or more traits exhibited by animals in the population; comparing the agent phenoprofile to a reference phenoprofile, wherein the reference phenoprofile comprises a quantitative description of the one or more traits exhibited by animals in a reference population; and selecting the agent based on the comparison of the agent phenoprofile corresponding to each agent and the reference phenoprofile.

Another aspect of the invention provides methods for determining parameters useful for a phenoprint which entail: measuring a plurality of traits in a first population of flies, the first population having a first phenoprofile; measuring the traits in a second population of flies, the second population having a second phenoprofile; comparing the traits of the first population and the second population; and identifying one or more traits that are different in the first and second populations, the one or more different traits defining the phenoprint. In some further embodiments, at least 2 traits define the phenoprint.

In another aspect, the invention provides methods for determining whether a test agent modifies, delays or prevents onset of a phenotype in a transgenic fly which entail: providing a population of transgenic flies, wherein the population develops a phenotype due to expression of a transgene; contacting the population with a test agent; for the population contacted with the test agent, determining an agent phenoprofile for the population at a plurality of times during the life of the fly; comparing the agent phenoprofile generated at each of the plurality of times to a reference phenoprofile generated at each of the plurality of times for a reference population, wherein the reference population consists of the transgenic flies not contacted with the test agent; and determining whether the test agent modifies, delays or prevents onset of a trait in a population contacted with a test agent compared to the reference population.

In another aspect, the invention provides methods of preparing a medicament for use in treatment of a disease in mammals which entail providing a population of flies with a phenotype with characteristics of a mammalian disease, using a method of screening for an agent with a desired biological activity of the invention to identify an agent with an agent phenoprofile that is similar to a phenoprofile of a population of flies with a healthy phenotype, and formulating the agent for administration to a mammal. In some further embodiments, population of flies have a phenotype characteristic of a mammalian neurodegenerative disease.

In a further aspect, the invention provides systems for use in accordance with the methods of the invention. Accordingly, another aspect of the invention provides systems to monitor the activity of flies in a plurality of containers. The systems may include: a container platform having an array of containers; a camera configured to capture a movie of the movement of flies within a container; a robot configured to remove a container from the platform, position the container in front of the camera, and return the container to the platform; and a processor configured to process the movie captured by the camera.

In some embodiments of the methods of the invention, the animals are flies. In some embodiments of the methods of the invention, the flies are transgenic. In further embodiments, the flies are transgenic for a gene encoding a polypeptide with an expanded polyglutamine tract as compared to the wild-type polypeptide and, in still further embodiments, expression of the transgene results neurodegeneration in the flies. In some embodiments of the methods of the invention, the flies contain a genetic mutation resulting in a loss of function or a gain of function.

In some embodiments of the methods of the invention, the reference population is (i) the transgenic flies not contacted with a test agent; (ii) the transgenic flies contacted with an agent with a know activity on the flies or in mammals; or (iii) nontransgenic flies with the genetic background of the transgenic flies, (iv) transgenic flies not expressing a disease gene and not contacted with a test agent.

In some embodiments of the methods of the invention, the reference population is (i) the flies containing the genetic mutation not contacted with a test agent; (ii) the flies containing the genetic mutation contacted with an agent with a known activity on the flies or in mammals; or (iii) flies without the genetic mutation.

In some embodiments of the methods of the invention, the traits are movement traits. In further embodiments, the movement traits are selected from the group consisting of total distance, X only distance, Y only distance, average speed, average X-only speed, average Y-only speed, and acceleration, and which are determined based on the measurement of one or more of X-pos, X-speed, speed, turning, stumbling, size, T-count, P-count, T-length, Cross150, Cross250, and F-count.

BRIEF DESCRIPTION OF THE DRAWINGS

The present invention can be best understood by reference to the following description taken in conjunction with the accompanying drawing figures, in which like parts may be referred to by like numerals:

FIG. 10 depicts an exemplary trajectory;

FIGS. 11A and 11B depict assigning an exemplary trajectory to an exemplary image block;

FIG. 12 depicts assigning two exemplary trajectories to an exemplary image block;

FIGS. 13A to 13E depict exemplary frames of a digitized movie;

FIGS. 14A to 14E depict exemplary binary images of the exemplary frames depicted in FIGS. 13A to 13E;

DETAILED DESCRIPTION OF THE INVENTION

Introduction

Figure 1:
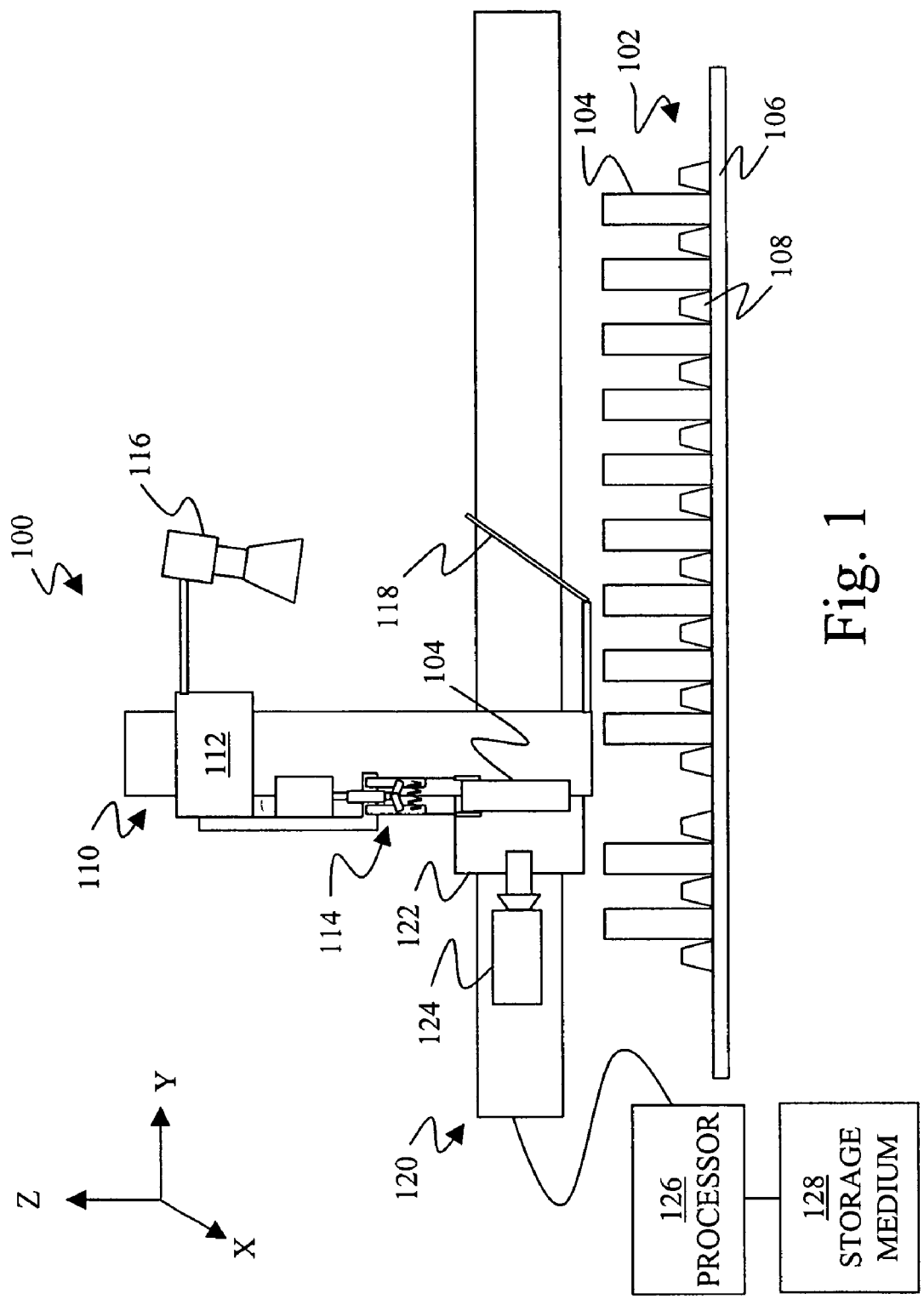
FIG. 1 is a side view of an exemplary motion tracking system.

The present invention provides new methodology for screening for agents with a desired biological activity. The invention is particularly useful for high throughput screening for agents with anti-neurodegenerative activity. The invention also provides new and efficient methodology for the quantitative description and/or characterization of one or more traits (e.g., behavior or locomotor activity) associated with an animal disease model. The invention also provides other methods and assays useful for identification of agents with therapeutic activity.

Although the methods of the invention can be applied using a variety of animals, as described below, they find particular application when practiced using populations of flies, e.g., *Drosphila melanogaster*. For convenience, but not for limitation, the description below will generally describe the invention as used when the test animals are flies.

The invention is described in detail in the following sections; however, a brief introductory description of one illustrative embodiment will assist the reader in the understanding of the invention. However, this introduction describing a particular embodiment is not to be construed as limiting the invention. In one embodiment, the invention provides methods for screening for the effects of a test agent on a population of animals which entail providing a population of animals, administering at least one test agent to the population, creating a digitized movie showing movement of animals in the population, determining at least two traits of the population, and correlating the traits of the population with the effect of the test agent(s) administered to the population. In another embodiment, the invention provides methods for screening for the effects of a test agent on a population of animals which entail providing a plurality of populations of animals, administering at least one test agent to each of the populations, creating a digitized movie showing movement of animals in each population, determining at least two traits of each population and, for each population, correlating the traits of the population with the effect of the test agent(s) administered to the population. In this context, the plurality of populations is at least 3 populations, and often more than 3, e.g., at least about 10 populations, at least about 20 populations, at least about 100 populations, or at least about 200 populations. In some embodiments of the invention, a large number of test populations are efficiently analyzed, for example, at least about 10 populations, at least about 20 populations, at least about 100 populations, at least about 200 populations, at least about 300 populations, at least about 400 populations or more can be tested in a single day.

Thus, for example methods of the invention are used to screen for biologically active agents in the following manner: Two stocks of *Drosphila melanogaster* are obtained; a parental stock and a transgenic stock that differs from the parent by virtue of comprising and expressing a transgene that causes a disease phenotype in the flies. An exemplary transgenic fly is a fly that exhibits neurodegeneration as a result of transgene expression.

In one aspect of the invention as encompassed in this illustrative embodiment, a number of traits exhibited by the parental stock and the transgenic stock are measured, and the traits of the two stocks are compared to identify particular traits that distinguish the two stocks. The measured traits usually include movement traits, behavioral traits, and/or morphological traits. In one aspect, the traits are measured by detecting and serially analyzing the movement of a population of flies in containers, e.g., vials. Movement of the flies is monitored by a recording instrument, such as a CCD-video camera, the resultant images are digitized, analyzed using processor-assisted algorithms, and the analysis data is stored in a computer-accessible manner. For example, in measuring traits related to fly movement, the trajectory of each animal may be monitored by calculation of one or more variables (e.g., speed, vertical only speed, vertical distance, turning frequency, frequency of small movements, etc.) for the animal. Values of such a variable are then averaged for population of animals in the container and a global value is obtained describing the trait for each population (e.g., parental stock flies and transgenic flies). Global values for each trait are compared and a subset of traits that differs significantly between the populations is identified. The subset of traits and the values of the traits for a particular population (e.g., the parental fly stock) is referred to as a "phenoprint" of that population. The phenoprint for a population is a useful tool in the identification of therapeutic agents. For example, an agent that affects various traits of the transgenic fly population with a neurodegenerative phenotype in a fashion that makes them more similar to the phenoprint of the parental population is likely to have biological activity protective against the effects of neurodegeneration.

In another aspect of the invention as encompassed in this illustrative embodiment, an automated system is used for highthroughput screening of agents with biological activity.

In one embodiment, for use in such a system, populations of transgenic flies, e.g., 2-50 flies, are contained in optically transparent vials containing support medium. A different test agent is administered to the flies in each vial, and the automated system is used to determine the traits for each population. As above, the traits can be measured by detecting and serially analyzing the movement of a population of flies in containers, e.g., vials. Movement of the flies is monitored by a recording instrument, such as a CCD-video camera, the resultant images are digitized. Movement, behavioral and morphological traits are determined by analysis of the images using processor-assisted algorithms, and the analysis data is stored in a computer-accessible manner. By comparing the traits of populations treated with different test agents with each other and/or with reference populations (such as parental wild-type flies) the ability of large numbers of test agents to affect neurodegeneration can be rapidly assessed. For example, the ability of an agent to change at least some traits of a transgenic population with a neurodegenerative phenotype to the traits characteristic of the parental flies is indicative of a desirable biological activity. The high throughput assay system of the invention allows for large scale testing of and/or screening for agents. The analysis of multiple traits, including specific traits described herein, allows the effects of test agents to be determined with much greater precision and sensitivity than other methods.

A wide variety of other embodiments will now be described.

Test and Reference Populations

This section describes test and reference populations, and introduces a number of other terms used to describe the invention.

A test population is a population of test animals that is contacted with a test agent. In one aspect of the invention, the effect of a test agent on a test population is determined. More usually, the effect of a number of different test agents on a number of different test populations is determined. In the latter case, the test animals in each of the different test populations is genetically similar or the same (e.g., all of a particular fly strain, all comprising the same transgene, etc., and optionally all male or all female). Thus, the fact that the test agent varies between test populations while the test animals are constant allows the effect of various test agents to be compared. The size of the population can vary, but for flies is usually between about 2 and 50 flies (inclusive), for example, between about 5 and about 30 flies, or between about 10 and about 30 flies. Usually the test population is confined in a container, such as a vial. Usually the container is optically transparent so that the traits of the population can be recorded.

The effect of the test agent on a population can be determined by measuring one or more traits exhibited by the population. Examples of traits that can be measured in the practice of the invention are described in some detail below. Briefly, however, exemplary traits include movement traits (e.g., path length, stumbling, turning, and/or speed), behavioral traits (e.g., appetite, mating behavior, and/or life span), and morphological traits (e.g., shape, size, or location in the animal of a cell, organ or appendage, or size, shape or growth rate of the animal, or the change of any such parameters over time). As is discussed below, movement is of particular interest. In one example, using the automated motion tracking system described herein, movement and behavior traits (particularly behavior trait(s) involving locomotor activity) of populations of flies are assessed over a short period of time (e.g., 1-20 seconds, more often 4 to 10 seconds) after a brief stimulus.

A description (e.g., a quantitative description) of one or more of the measured traits together defines a "phenoprofile" of the test population. A hypothetical example of a phenoprofile is provided in Table 1, infra. The phenoprofile of a population treated with a specific test agent is referred to as the "agent phenoprofile."

Another type of phenoprofile is a "reference phenoprofile," which is a quantitative description of the traits exhibited by a reference population. A reference population may be any of several different populations of flies, and in some methods of the invention, traits of a test population of flies are compared to traits of a reference population of animals, or stated somewhat differently, an agent phenoprofile is compared to a reference phenoprofile. Animals used as the reference population in any given assay will generally depend on the test population and/or on the particular method and/or assay performed. For example, when a method involves the use of transgenic flies which express a particular transgene that results in specific behavior trait(s), a reference population may be non-transgenic flies with the same genetic background as the transgenic flies (except for the particular transgene that results in the behavior phenotype). As another example, when a method analyzes a population of flies treated with a test agent, the reference population may be a population of the same flies not treated with the test agent or the reference population may be a population of flies treated with a specified agent, for example an agent that has a known effect on the animals. As another example, when a method involves the use of flies with a genetic alteration which results in a change in level of expression of an endogenous polypeptide (e.g., an alteration which produces a gain of function or a loss of function result), a reference population may be flies without the mutation. In some instances, a reference population may consist of a population of flies with a different transgene than that of the test population so that a phenotype due to expression of a transgene in a test population can be compared to a phenotype due to the expression of a different transgene in the reference population.

In some embodiments, more than one reference population of flies is used. For example, when analyzing the effect of a test agent on a test population, the phenoprofile that results from exposure to the agent (the agent phenoprofile) may be compared to a reference phenoprofile of the same population of flies not treated with a test agent and to a reference phenoprofile of wild-type flies. It will be apparent that the test and reference populations in any assay are the same species.

The particular traits exhibited by (and thus the particular phenoprofile of) the test and/or reference population(s) is influenced by the genotype of the animal, the properties of any test agent to which the animal is exposed, the age of the animal and other factors. In this context, the term "genotype" is defined broadly and includes, for example, a variety of gene expression events such as the expression of a mutated gene, the failure of expression of a normally expressed gene and/or the expression of a transgene.

Test Animals

Animals for use in the methods of the invention are generally members of the class insecta, for example, but not limited to, dipterans and lepidopterans, although in principle other animals (e.g., an organism classified in the kingdom Animalia), including other invertebrates, e.g., nematodes such as *C. elegans*, and vertebrates, e.g., zebrafish and mice, may be used in the methods. In a preferred embodiment, the methods of the invention are adapted to screen insects. As used herein, "insect" refers to an organism classified in the class insecta, and preferably refers to an organism in the order diptera. Of particular use in many embodiments is an insect which is a fly. Examples of such flies include members of the family Drosophilidae, including *Drosophila melanogaster*, and other flies such as Simulium sp. (black fly), *Musca domestica* (house fly), Mediterranean fruitfly, *C. capitata* (Medfly), black fly, blow fly, cluster fly, drain fly, Hessian fly, and the like. In certain embodiments, the flies are transgenic flies, e.g., transgenic *Drosophila melanogaster*. A transgenic animal is an animal comprising heterologous DNA (e.g., from a different species) incorporated into its chromosomes. In other embodiments, the animals contain a genetic alteration which results in a change in level of expression of an endogenous polypeptide (e.g., an alteration which produces a gain of function or a loss of function result). The term animal or transgenic animal can refer to animals at any stage of development, e.g. adult, fertilized eggs, embryos, larva, etc.

In particular embodiments, test animals used in methods of the invention exhibit one or more traits that is indicative of and/or characterizes a neurodegenerative condition in the animal (e.g., including impaired motor skills, impaired cognition, neuronal cell death, etc.). In some cases, test animals are flies which exhibit phenotypes which characterize adult onset neurodegenerative disorders, e.g., following the initial hours of adult life; the flies exhibit a neurodegeneration phenotype, including, but not limited to: progressive loss of neuromuscular control, e.g. of the wings; progressive degeneration of general coordination; progressive degenerative of locomotion; and progressive degeneration of appetite. Some flies may also be further characterized in that death occurs prematurely compared to wild-type flies, for example, at 4 to 6 days of adult life. Useful test animals include animal models for adult onset neurodegenerative disorders, such as: Parkinson's Disease, Alzheimer's Disease, Huntington's Disease, spinocerebellar ataxia (SCA), and the like.

In some embodiments, animals for use in methods of the invention are transgenic insects (or other transgenic animals) that harbor a stably integrated transgene that is expressed in a manner sufficient to result in a phenotype different from that of wild-type animals, e.g., a neurodegenerative phenotype. The term "transgene" is used herein to describe genetic material which has been or is about to be artificially inserted into the genome of a cell. In some instances, the transgene must be expressed in a specific manner spatially and/or temporally in the animal to result in the desired phenotype. For example, with regard to a neurodegenerative phenotype, spatial expression of a particular transgene may be limited to neuronal cells. In other instances, specific spatial and/or temporal expression of a transgene is not required to result in the desired phenotype, including a neurodegenerative phenotype.

Examples of transgenes used in insects, such as flies, include, but are not limited to, mammalian transgenes, human transgenes, genes found to be associated with a human disease (e.g., CNS or neurodegenerative disease) and genes that encode proteins associated directly or indirectly with a human disease. For example, introduction of human disease genes with dominant gain-of-function mutations into *Drosophila* has generated fly models for a number of neurodegenerative diseases. See, for example, Chan et al. (2000); Feany et al. (2000); Femandez-Funez et al. (2000); Fortini et al. (2000); Jackson et al. (1998); Kazemi-Esfarjani et al. (2000); Warrick et al. (1998); Wittmann et al. (2001) Science 293: 711-4.

Examples of genes associated with human neurodegenerative diseases include those identified as having an expanded trinucleotide sequence as compared to the wild-type gene and thus, encode for a polypeptide with an expanded polyglutamine tract as compared to the wild-type polypeptide.

Examples of diseases associated with polyglutamine repeats include Huntington's Disease, spinocerebellar ataxia type 1 (SCA1), SCA2, SCA3, SCA6, SCA7, SCA17, spinobulbar muscular atrophy and dentatorubropallidolusyan atrophy (DRPLA) (Cummings et al. (2000) *Human Mol. Genet.* 9:909-916; Fischbeck (2001) *Brain Res. Bull.* 56:161-163; Nakamura et al. (2001) *Hum. Mol. Genet.* 10:1441-1448). For example, expression of the mutated human ataxin-1 in transgenic flies (the polypeptide encoded by the gene associated with SCA1) is accompanied by adult-onset degeneration of neurons, with nuclear inclusions that are immunologically positive for the mutated protein, ubiquitin, Hsp70 and proteosome components (Femandez-Funez et al., 2000). In addition, in flies which express the SCA1 or SCA3 disease genes, the disease is modified by overexpression of chaperones (Fernandez-Funez et al., 2000; Warrick et al., 1999). Transgenic flies that express exon-1 of huntingtin, a polypeptide encoded by the gene associated with Huntington's Disease and which contains an expanded polyglutamine repeat, demonstrate a progressive neurodegeneration where the time of onset and severity are linked to the length of the polyglutamine repeat (Marsh et al., 2000).

Transgenic *Drosophila* with neuronal expression of human mutated alpha-synuclein, a polypeptide encoded by a gene associated with Parkinson's disease, demonstrate age-dependent, progressive degeneration of dopamine-containing cells and the presence of Lewy bodies (Feany et al., 2000). These transgenic flies expressing mutated human alpha-synuclein have impaired motor performance (Feany et al. (2002) and this disease in flies is modified by overexpression of chaperones (Auluck et al. (2002) *Science* 295:865-868). Transgenic *Drosophila* expressing tau protein show neurodegeneration (Wittmann et al. (2001) *Science* 293:711-4).

As noted, the transgenic flies used in the invention generally exhibit at least one measurable behavior and/or morphological phenotype associated with the expression of the transgene. The phenotype of the transgenic fly may or may not be similar to the behavior and/or morphological phenotype associated with the expression of the transgene, or the gene from which the transgene was derived, in another type of animal, such as a vertebrate.

Transgenic animals for use in the invention can be prepared using any convenient protocol that provides for stable integration of the transgene into the animal genome in a manner sufficient to provide for the requisite expression of the transgene. Methods for preparing transgenic insects, including the use of mobile elements such as PiggyBAC, MINOS, hermes, hobo and mariner, are described in the art. See, for example, Horn et al. (2000) *Dev. Genes Evol.* 210:630-637; Handler et al. (1999) *Insect Mol. Biol.* 8:449-457; Lobo et al. (1999) *Mol. Gen. Genet.* 261:803-810; U.S. Pat. Nos. 6,051,430, 6,218,185, 6,225,121. Methods of random integration of transgenes into the genome of a target *Drosophila melanogaster* cell(s) are disclosed in U.S. Pat. No. 4,670,388, the disclosure of which is herein incorporated by reference. Methods for preparing transgenic flies, including the use of the P element, are described in the art. See, for example, Brand et al. (1993); Phelps et al. (1998) *Methods* 14:367-379; Spradling et al. (1982) *Science* 218:341-347; Spradling (1986) P ELEMENT MEDIATED TRANSFORMATION IN DROSOPHILA: A PRACTICAL APPROACH (ed. D. D. Roberts, IRL Press, Oxford) pp 175-179.

Generally, the transgene is stably integrated into the genome of the animal under the control of a promoter that provides for expression of the transgene. In some cases, the transgene is stably integrated into the genome of the animal in a manner such that its expression is controlled spatially to a desired cell type and/or temporally to a particular developmental stage. In other cases, although transgene expression is required, spatial and/or temporal control of the expression is not necessary for the generation of a phenotype associated with the transgene expression. The transgene may be under the control of any convenient promoter that provides for requisite spatial and temporal expression pattern, if necessary, and the promoter may be endogenous or exogenous. To obtain the desired targeted expression of the randomly integrated transgene, integration of particular promoter upstream of the transgene (e.g., an exogenous promoter), as a single unit in the element or vector may be employed.

When an endogenous promoter is used, a suitable promoter is located in the genome of the animal. The transgene may then be integrated into the fly genome in a manner that provides for direct or indirect expression activation by the promoter, i.e. in a manner that provides for either cis or trans activation of gene expression by the promoter. In other words, expression of the transgene may be mediated directly by the promoter, or through one or more transactivating agents. Where the transgene is under direct control of the promoter, i.e. the promoter regulates expression of the transgene in a cis fashion, the transgene is stably integrated into the genome of the fly at a site sufficiently proximal to the promoter and, if necessary, in frame with the promoter such that cis regulation by the promoter occurs.

In other embodiments where expression of the transgene is indirectly mediated by the endogenous promoter, the promoter controls expression of the transgene through one or more transactivating agents, usually one transactivating agent, i.e. an agent whose expression is directly controlled by the promoter and which binds to the region of the transgene in a manner sufficient to turn on expression of the transgene. Any convenient transactivator may be employed. For example, in a transgenic fly which uses the GAL4 transactivator system, a GAL4 encoding sequence is stably integrated into the genome of the animal in a manner such that it is operatively linked to the endogenous promoter that provides for expression in the cells of interest. With the GAL4 targeted expression system, the transgene which results in the desired phenotype is generally stably integrated into a different location of the genome, generally a random location in the genome, where the transgene is operatively linked to an upstream activator sequence, i.e. UAS sequence, to which GAL4 binds and turns on expression of the transgene. Transgenic flies having a GAL4/UAS transactivation system are known to those of skill in the art and are described, for example, in Brand et al. (1993); Phelps et al. (1998); and Femandez-Funez et al. (2000).

Non-transgenic Flies

In some embodiments, animals for use in methods of the invention are insects (or other animals) that have a mutation that disrupts one or more of their endogenous genes thereby generating a loss-of-function disease phenotype. In *Drosophila*, for example, genes which are homologs of a human disease genes can be disrupted to produce files with a loss-of function phenotype. See, for example, Reiter et al. (2001) *Genome Res.* 11:1114-1125 and The et al. (1997) *Science* 276:791-794.

A variety of loss-of-function mutations in endogenous fly genes have been identified. Examples of such mutations in genes that produce nervous system disorders include swiss cheese (Kretzschmar et al. (1997) *J. Neurosci.* 17:7425-7432), spongecake, eggroll (Min et al. (1997) *Curr. Biol.* 7:885-888), drop dead (Buchanan et al. (1993) *Neuron* 10:839-850), pirouette (Eberl et al. (1997) *Proc. Natl Acad.*

Sci. USA 94:14837-14842), and bubblegum (Min et al. (1999) Science 284:1985-1988). The bubblegum mutant provides an example of a direct connection between a fly neurodegeneration mutant and a human disease. Both bubblegum flies and patients with the metabolic disorder adrenoleukodystrophy (ALD) accumulate abnormal amounts of very long chain fatty acids (VLCFAs). The bubblegum mutant flies have a mutation in the VLCFA acyl coenzyme A synthetase gene. This enzyme has reduced activity in patients with ALD. Primary defects in glial cells have been implicated as an important mechanism of neurodegeneration in *Drosophila*. The drop dead and swiss cheese mutants show glial abnormalities before neurons degenerate. Similarly, primary glial cell defects underlie neurodegeneration in some forms of human hereditary peripheral nerve degeneration, such as Charcot-Marie-Tooth disease (Bennett et al. (2001) *Curr. Opin. Neurol.* 14:621-627).

Examples of loss-of-function mutations in flies that produce stereotypic paralysis and seizures include easily shocked (eas) and slamdance (sda) (Pavlidis et al. (1994) *Cell* 79:23-33; Kuebler et al. (2001) *J. Neurophysiol.* 86:1211-1225). *Drosophila* is a faithful system to identify factors that suppress seizure susceptibility. For example, anti-epileptic drugs such as Gabapentin, Topiramate and Phenytoin administered orally to flies reduce seizure and mean recovery times following seizure (Reynolds et al. (2002) 43$^{rd}$ Annual *Drosophila* Genetics Conference).

For use in the invention, animals can be prepared by any protocol that disrupts the expression of a gene or genes. For example, the disruption of genes in *Drosophila* may be accomplished by using P-element transposons (Rubin et al. (1982) *Science* 218:348-353), chromosomal aberrations may be generated in *Drosophila* by subjecting flies to irradiation (Sullivan et al. (2000) *Drosophila* Protocols (2000) Cold Spring Harbor Laboratory Press, New York, pp. 592-593). Additionally, single-base-pair mutations can be can be generated in fly genes with chemical mutagens such as ethylmethanesulfonate (EMS) or ethylnitrosourea (ENU) (Sullivan et al. (2000)). The ability to identify chemically generated point mutations using a set of single nucleotide polymorphisms which span the *Drosophila* genome has broadened this approach by facilitating chemical-mutagen suppressor screens of a given loss of function phenotype. See, for example, Lukacsovich et al. (2001) *Genetics* 157:727-742; Berger et al. (2001) *Nat. Genet.* 29:475-481.

In some embodiments, animals for use in methods of the invention are wild-type insects (or other animals) that suffer from age related motor dysfunction and age-related death. As in humans, flies demonstrate poor motor performance in latter weeks of their life (Fernández et al. (1999) *Experimental Gerontology* 34:621-631; Le Bourg (1987) *Experimental Gerontology* 4:359-369). Feeding *Drosophila* with 4-phenylbutyrate (PBA) can significantly increase lifespan, without diminution of locomotor vigor (Kang et al. (2002) *Proc. Natl. Acad. Sci. USA* 99:838-843).

In some embodiments, animals for use in methods of the invention are wild-type insects (or other animals) that are subjected to environmental stimuli or treated with a substance that produces a disease-like state. For example, rest behavior in *Drosophila* is a sleep-like state where the animals choose a preferred location, become immobile for periods a particular time in the circadian day, and are relatively unresponsive to sensory stimuli (Hendricks et al. (2000) *Neuron* 25:129-138). Rest is affected by both homeostatic and circadian influences and when rest is prevented, the flies increasingly tend to rest despite stimulation and then exhibit a rest rebound. Drugs which act on a mammalian adenosine receptor alter rest as they do sleep, suggesting conserved neural mechanisms. In other examples, wild-type *Drosophila* demonstrate behavioral traits that resemble aggression when they are placed in a competitive situation, such as courtship (Chen et al. (2002) *Proc. Natl. Acad. Sci. USA* 99:5664-5668) and *Drosophila* are sensitive to a depression-like or stress-like environment [Le Bourg et al. (1999) *Experimental Gerontology* 34:157-172; Le Bourg et al. (1995) *Behavioural Processes* 34:175-184).

Animals treated with a substance for use in the invention, for example, include wild-type animals exposed to an additive substance. Upon exposure to ethanol or other addictive substances, wild-type *Drosophila* display behaviors that are similar to intoxication and addiction seen in rodents and humans (Bellen (1998) *Cell* 93:909-912). One example of a fly mutant with enhanced sensitivity to ethanol is cheapdate (Moore et al. (1998) *Cell* 93:997-1007). Other addictive substances for use in the animals may include, for example, cocaine and nicotine (Bainton et al. (2000) *Curr Biol.* 10:187-194; Torres et al. (1998) *Synapse* 29:148-161).

Chemical-induced models of human disease in animals include, for example, those which target dopamine neurons such as 1-methyl-4-phenyl-1,2,3,6-tetrahydropyridine (MPTP) or 6-hydroxydopamine (6-OHDA) (Beal (2001) *Nat. Rev. Neurosci.* 2:325-334). Other examples of chemicals for the generation of such models include, but are not limited to, cholinergic agonists, carbachol, muscarine, pilocarpine, and acetylcholine (Gorczyca et al. (1991) *J. Neurobiol.* 22:391-404). Additionally, olfactory sensitivity, shock reactivity, and locomotor behavior in flies can be manipulated with hydroxyurea (de Belle et al. (1994) *Science* 263:692-695).

Traits

A phenoprofile of a test or reference population is determined by measuring traits of the population. The present invention allows simultaneous measurement of multiple traits of a population. Although a single trait may be measured, more often at least 2, at least 3, at least 4, at least 5, at least 7 or at least 10 traits are assessed for a population. The traits measured can be solely movement traits, solely behavioral traits solely morphological traits or a mixture of traits in multiple categories. In some embodiments at least one movement trait and at least one non-movement trait is assessed.

The present invention provides for the analysis of the movement of a plurality of biological specimens, and further contemplates that the measurements made of a biological specimen may additionally include other physical trait data. As used herein, "physical trait data" refers to, but is not limited to, movement trait data (e.g., animal behaviors related to locomotor activity of the animal), and/or morphological trait data, and/or behavioral trait data. Examples of such "movement traits" include, but are not limited to:

a) total distance (average total distance traveled over a defined period of time);

b) X only distance (average distance traveled in X direction over a defined period of time;

c) Y only distance (average distance traveled in Y direction over a defined period of time);

d) average speed (average total distance moved per time unit);

e) average X-only speed (distance moved in X direction per time unit);

f) average Y-only speed (distance moved in Y direction per time unit);

g) acceleration (the rate of change of velocity with respect to time);

h) turning;

i) stumbling;

j) spatial position of one animal to a particular defined area or point (examples of spatial position traits include (1) average time spent within a zone of interest (e.g., time spent in bottom, center, or top of a container; number of visits to a defined zone within container); (2) average distance between an animal and a point of interest (e.g., the center of a zone); (3) average length of the vector connecting two sample points (e.g., the line distance between two animals or between an animal and a defined point or object); (4) average time the length of the vector connecting the two sample points is less than, greater than, or equal to a user define parameter; and the like);

m) path shape of the moving animal, i.e., a geometrical shape of the path traveled by the animal (examples of path shape traits include the following: (1) angular velocity (average speed of change in direction of movement); (2) turning (angle between the movement vectors of two consecutive sample intervals); (3) frequency of turning (average amount of turning per unit of time); (4) stumbling or meandering (change in direction of movement relative to the distance); and the like. This is different from stumbling as defined above. Turning parameters may include smooth movements in turning (as defined by small degrees rotated) and/or rough movements in turning (as defined by large degrees rotated).

"Movement trait data" as used herein refers to the measurements made of one or more movement traits. Examples of "movement trait data" measurements include, but are not limited to X-pos, X-speed, speed, turning, stumbling, size, T-count, P-count, T-length, Cross150, Cross250, and F-count. Descriptions of these particular measurements are provided below.

X-Pos: The X-Pos score is calculated by concatenating the lists of x-positions for all trajectories and then computing the average of all values in the concatenated list.

X-Speed: The X-Speed score is calculated by first computing the lengths of the x-components of the speed vectors by taking the absolute difference in x-positions for subsequent frames. The resulting lists of x-speeds for all trajectories are then concatenated and the average x-speed for the concatenated list is computed.

Speed: The Speed score is calculated in the same way as the X-Speed score, but instead of only using the length of the x-component of the speed vector, the length of the whole vector is used. That is, [length]=square root of ([x-length]$^2$+[y-length]$^2$).

Turning: The Turning score is calculated in the same way as the Speed score, but instead of using the length of the speed vector, the absolute angle between the current speed vector and the previous one is used, giving a value between 0 and 90 degrees.

Stumbling: The Stumbling score is calculated in the same way as the Speed score, but instead of using the length of the speed vector, the absolute angle between the current speed vector and the direction of body orientation is used, giving a value between 0 and 90 degrees.

Size: The Size score is calculated in the same way as the Speed score, but instead of using the length of the speed vector, the size of the detected fly is used.

T-Count: The T-Count score is the number of trajectories detected in the movie.

P-Count: The P-Count score is the total number of points in the movie (i.e., the number of points in each trajectory, summed over all trajectories in the movie).

T-Length: The T-Length score is the sum of the lengths of all speed vectors in the movie, giving the total length all flies in the movie have walked.

Cross150: The Cross150 score is the number of trajectories that either crossed the line at x=150 in the negative x-direction (from bottom to top of the vial) during the movie, or that were already above that line at the start of the movie. The latter criteria was included to compensate for the fact that flies sometimes don't fall to the bottom of the tube. In other words this score measures the number of detected flies that either managed to hold on to the tube or that managed to climb above the x=150 line within the length of the movie.

Cross250: The Cross250 score is equivalent to the Cross150 score, but uses a line at x=250 instead.

F-Count: The F-Count score counts the number of detected flies in each individual frame, and then takes the maximum of these values over all frames. It thereby measures the maximum number of flies that were simultaneously visible in any single frame during the movie.

The assignment of directions in the X-Y coordinate system is arbitrary. For purposes of this disclosure, "X" refers to the vertical direction (typically along the long axis of the container in which the flies are kept) and "Y" refers to movement in the horizontal direction (e.g., along the surface of the vial).

For each of the various trait parameters described, statistical measures can be determined. See, for example, PRINCIPLES OF BIOSTATISTICS, second edition (2000) Mascello et al., Duxbury Press. Examples of statistics per trait parameter include distribution, mean, variance, standard deviation, standard error, maximum, minimum, frequency, latency to first occurrence, latency to last occurrence, total duration (seconds or %), mean duration (if relevant).

Certain other traits (which may involve animal movement) can be termed "behavioral traits." Examples of behavioral traits include, but are not limited to, appetite, mating behavior, sleep behavior, grooming, egg-laying, life span, and social behavior traits, for example, courtship and aggression. Social behavior traits may include the relative movement and/or distances between pairs of simultaneously tracked animals. Such social behavior trait parameters can also be calculated for the relative movement of an animal or between animal(s) and zones/points of interest. Accordingly, "behavioral trait data" refers to the measurement of one or more behavioral traits. Examples of such social behavior trait traits include, for example, the following:

a) movement of one animal toward or away from another animal;

b) occurrence of no relative spatial displacement of two animals;

c) occurrence of two animals within a defined distance from each other;

d) occurrence of two animals more than a defined distance away from each other.

In addition to traits based on specimen movement and/or behavior, other traits of the specimens may be determined and used for comparison in the methods of the invention, such as morphological traits. As used herein, "morphological traits" refer to, but are not limited to gross morphology, histological morphology (e.g., cellular morphology), and ultrastructural morphology. Accordingly, "morphological trait data" refers to the measurement of a morphological trait. Morphological traits include, but are not limited to, those where a cell, an organ and/or an appendage of the specimen is of a different shape and/or size and/or in a different position and/or location in the specimen compared to a wild-type specimen or compared to a specimen treated with a drug as opposed to one not so treated. Examples of morphological traits also include those where a cell, an organ and/or an appendage of the specimen is of different color and/or texture compared to that in a wild-type specimen. An example of a morphological trait is the sex of an animal (i.e., morphological differences due to sex of the animal). One morphological trait that can be determined relates to eye morphology. For example, neurodegeneration is readily observed in a *Drosophila* compound eye, which can be scored without any preparation of the specimens (Fernandez-Funez et al., 2000, *Nature* 408:101-106; Steffan et. al, 2001, *Nature* 413:739-743). This organism's eye is composed of a regular trapezoidal arrangement of seven visible rhabdomeres produced by the photoreceptor neurons of each *Drosophila ommatidium*. Expression of mutant transgenes specifically in the *Drosophila* eye leads to a progressive loss of rhabdomeres and subsequently a rough-textured eye (Fernandez-Funez et al., 2000; Steffan et. al, 2001). Administration of therapeutic compounds to these organisms slows the photoreceptor degeneration and improves the rough-eye phenotype (Steffan et. al, 2001). In one embodiment, animal growth rate or size is measured. For example *Drosophila* mutants that lack a highly conserved neurofibromatosis-1 (NF1) homolog are reduced in size, which is a defect that can be rescued by pharmacological manipulations that stimulate signalling through the cAMP-PKA pathway (The et al., 1997, *Science* 276:791-794; Guo et al., 1997, *Science* 276:795-798).

Effect of Sex and Environment on Traits

Traits exhibited by the populations may vary, for example, with environmental conditions, age of the animals and/or sex of the animals. For traits in which such variation occurs, assay and/or apparatus design can be adjusted to control possible variations. Apparatus for use in the invention can be adjusted or modified so as to control environmental conditions (e.g., light, temperature, humidity, etc.) during the assay. The ability to control and/or determine the age of a fly population, for example, is well known in the art. For those traits which has a sex-specific bias or outcome, the system and software used to assess the trait can sort the results based a detectable sex difference in of the animals. For example, male and female flies differ detectably in body size. Thus, analysis of sex-specific traits need not require separated male and/or female populations. However, sex-specific populations of animals can be generated by sorting using manual, robotic (automated) and/or genetic methods as known in the art. For example, a marked-Y chromosome carrying the wild-type allele of a mutation that shows a rescuable maternal effect lethal phenotype can be used. See, for example, Dibenedetto et al. (1987) *Dev. Bio.* 119:242-251.

Analysis of Traits

The present invention makes use of an automated system to provide a quantitative description of traits and determine phenoprofiles. An automated system is a system that includes one or more of the following features or elements: a short cycle time, operates continuously and/or requires little or no manual intervention. For example, such a system would be a motion tracking system and would include a machine apparatus coupled to a robotic system for handling containers of animals (i.e., specimen containers), a computer-vision system to measure animal traits and a system to archive the output.

In one embodiment, a large number of test populations are analyzed using the automated system, for example, at least about 10 populations, at least about 20 populations, at least about 100 populations, at least about 200 populations, at least about 300 populations, at least about 400 populations or more can be tested in a single day.

In an aspect, the invention provides a system useful for the practice of the screening and analysis methods described herein. Generally the system includes a container platform having an array of containers suitable for housing animals. For example, the animals can be insects (e.g., flies) or other invertebrates. Generally the system includes a nonvisual detection means (camera) configured to capture a movie of the movement of animals in the container, and a robot configured to move the containers into a position such that the animals in the container can be viewed by the camera, and a processor configured to process the movie captured by the camera. In one embodiment, the robot is configured to remove a container from the platform, position the container in front of the camera, and return the container to the platform.

An exemplary automated system is described in FIG. 1, for illustration and not limitation. It will be appreciated that a variety of modifications can be made to the system described below, and that other, different systems, may be used in the method of the invention. As described below, motion tracking system 100 can operate to monitor the activity of specimens in specimen containers 104. In the practice of the invention with flies, the specimen containers (e.g., vials, tubes) contain nutrient medium, for example, including agar support medium, food and/or yeast paste (with or without test agent), and a population of about 2 to about 50, about 5 to about 30, about 10 to about 30, about 10 to about 40, or typically about 10 to about 20, flies. If desired, the files can be reared, stored and assayed (one or more times) in the same container.

A. Robotics

In FIG. 1, an exemplary motion tracking system 100 is depicted. As described below in greater detail, motion-tracking system 100 can operate to monitor the activity of specimens in specimen containers 104. For the sake of example, motion tracking system 100 is described below in connection with monitoring the activity of flies within optically transparent tubes. It should be noted, however, that motion-tracking system 100 can be used in connection with monitoring the activities of various biological specimens within various types of containers.

In one exemplary embodiment of motion tracking system 100, a robot 114 removes a specimen container 104 from a specimen platform 102, which holds a plurality of specimen containers 104. Robot 114 positions specimen container 104 in front of camera 124. Specimen container 104 is illuminated by a lamp 116 and a light screen 118. Camera 124 then captures a movie of the activity of the biological specimens within specimen container 104. After the movie has been obtained, robot 114 places specimen container 104 back onto specimen platform 102. Robot 114 can then remove another specimen container 104 from specimen platform 102. A processor 126 can be configured to coordinate and operate specimen platform 102, robot 104, and camera 124. As described below, motion tracking system 100 can be configured to receive, store, process, and analyze the movies captured by camera 124.

In the present embodiment, specimen platform 102 includes a base plate 106 into which a plurality of support posts 108 is implanted. In one exemplary configuration, specimen platform 102 includes a total of 416 support posts 108 configured to form a 25×15 array to hold a total of 375 specimen containers 104. As depicted in FIG. 1A, support posts 108 can be tapered to facilitate the placement and removal of specimen containers 104. It should be noted that specimen platform 102 can be configured to hold any number of specimen containers 104 in any number of configurations.

Motion tracking system 100 also includes a support beam 110 having a base plate 112 that can translate along support beam 110, and a support beam 120 having a base plate 122 that can translate along support beam 120. In FIG. 1A, support beam 110 and support beam 120 are depicted extending along the Y axis and Z axis, respectively. As such, base plate 112 and base plate 122 can translate along the Z axis and Y axis, respectively. It should be noted, however, that the labeling of the X, Y, and Z axes in FIG. 1A is arbitrary and provided for the sake of convenience and clarity.

In the present embodiment, robot 114 and lamp 116 are attached to base plate 112, and camera 124 is attached to base plate 122. As such, robot 114 and lamp 116 can be translated along the Z axis, and camera 124 can be translated along the Y axis. Additionally, support beam 110 is attached to base plate 122, and can thus translate along the Y axis. Support beam 120 can also be configured to translate along the X axis. For example, support beam 120 can translate on two linear tracks, one on each end of support beam 120, along the X axis. As such, robot 114 can be moved in the X, Y, and Z directions. Additionally, robot 114 and camera 124 can be moved to various X and Y positions over specimen platform 102. Alternatively, specimen platform 102 can be configured to translate in the X and/or Y directions.

Motion tracking system 100 can be placed within a suitable environment to reduce the effect of external light conditions. For example, motion tracking system 100 can be placed within a dark container. Additionally, motion tracking system 100 can be placed within a temperature and/or humidity controlled environment.

B. Capturing and Processing Images of Specimens

As noted above, motion-tracking system 100 can be used to monitor the activity of specimens within specimen container 104. As also noted above, in one exemplary application, the movement of flies within specimen container 104 can be captured in a movie taken by camera 124, then analyzed by processor 126. As used herein, the term "movie" has its normal meaning in the art and refers a series of images (e.g., digital images) called "frames" captured over a period of time. A movie has two or more frames and usually comprises at least 10 frames, often at least about 20 frames, often at least about 40 frames, and often more than 40 frames. The frames of a movie can be captured over any of a variety of lengths of time such as, for example, at least one second, at least about two, at least about 3, at least about 4, at least about 5, at least about 10, or at least about 15 seconds. The rate of frame capture can also vary. Exemplary frame rates include at least 1 frame per second, at least 5 frames per second or at least 10 frames per second. Faster and slower rates are also contemplated.

In the present exemplary application, to capture a movie of the movement of flies within specimen container 104, robot 114 grabs a specimen container 104 and positions it in front of camera 124. However, before positioning specimen container 104 in front of camera 124, robot 114 first raises specimen container 104 above a distance, such as about 2 centimeters, above base plate 106, then releases specimen container 104, which forces the flies within specimen container 104 to fall down to the bottom of specimen container 104. Robot 114 then grabs specimen container 104 again and positions it to be filmed by camera 124. In one exemplary embodiment, camera 124 captures about 40 consecutive frames at a frame rate of about 10 frames per second. It should be noted, however, that the number of frames captured and the frame rate used can vary. Additionally, the step of dropping specimen container 104 prior to filming can be omitted.

As described above, motion tracking system 100 can be configured to receive, store, process, and analyze the movie captured by camera 124. In one exemplary embodiment, processor 126 includes a computer with a frame grabber card configured to digitize the movie captured by camera 124. Alternatively, a digital camera can be used to directly obtain digital images. Motion tracking system 100 can also includes a storage medium 128, such as a hard drive, compact disk, digital videodisc, and the like, to store the digitized movie. It should be noted, however, that motion tracking system 100 can include various hardware and/or software to receive and store the movie captured by camera 124. Additionally, processor 126 and/or storage medium 128 can be configured as a single unit or multiple units.

Figure 2:
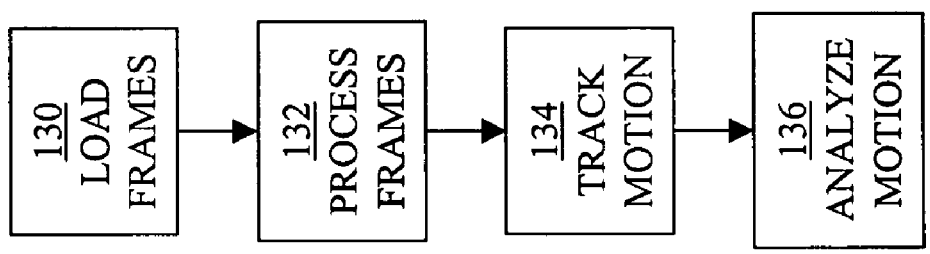
FIG. 2 is an exemplary process for processing and analyzing a digitized movie.

With reference to FIG. 2, an exemplary process of processing and analyzing the movie captured by camera 124 (FIG. 1) is depicted. In one exemplary embodiment, the exemplary process depicted in FIG. 2 can be implemented in a computer program.

In step 130, the frames of the movie are loaded into memory. For example, processor 126 can be configured to obtain one or more frames of the movie from storage medium 128 and load the frames into memory. In step 132, the frames are processed, in part, to identify the specimens within the movie. In step 134, the movements of the specimens in the movie are tracked. In step 136, the movements of the specimens are then analyzed. It should be noted that one or more of these steps can be omitted and that one or more additional steps can also be added. For example, the movements of the specimens in the movie can be tracked (i.e., step 134) without having to analyze the movements (i.e., step 136). As such, in some applications, step 136 can be omitted.

Figure 3:
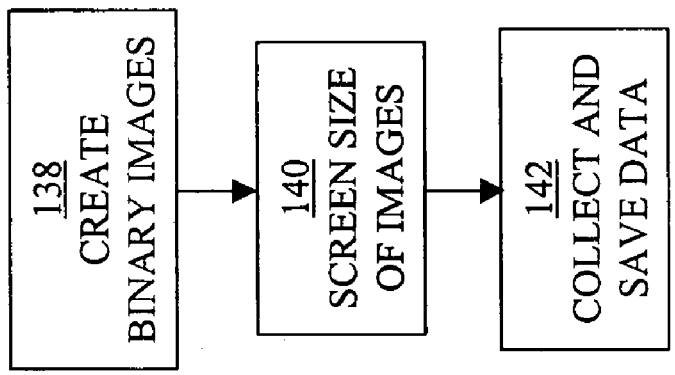
FIG. 3 is an exemplary process for processing frames of a digitized movie.

With reference to FIG. 3, an exemplary process of processing the frames of the movie (i.e., step 132 in FIG. 2) is depicted. In one exemplary embodiment, the exemplary process depicted in FIG. 3 can be implemented in a computer program.

Figure 4:
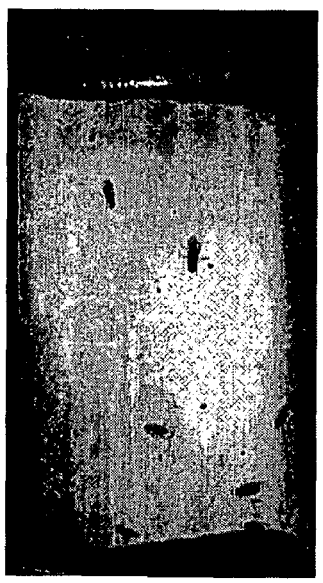
FIG. 4 depicts an exemplary frame of a digitized movie.

FIG. 4 depicts an exemplary frame of biological specimens within a specimen container 104 (FIG. 1), which in this example are flies within a transparent tube. As depicted in FIG. 4, the frame includes images of flies in specimen container 104 (FIG. 1) as well as unwanted images, such as dirt, blemishes, occlusions, and the like. As such, with reference to FIG. 3, in step 138, a binary image is created for each frame of the movie to better identify the images that may correspond to flies in the frames.

Figure 5:
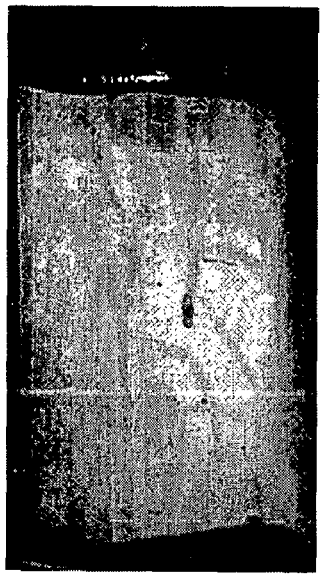
FIG. 5 depicts an exemplary background approximation of an exemplary frame of a digitized movie.

In one exemplary embodiment, a background approximation for the movie can be obtained by superimposing two or more frames of the movie, then determining a characteristic pixel value for the pixels in the frames. The characteristic pixel value can include an average pixel value, a median pixel value, and the like. Additionally, the background approximation can be obtained based on a subset of frames or all of the frames of the movie. The background approximation normalizes non-moving elements in the frames of the movie. FIG. 5 depicts an exemplary background approximation. In the exemplary background approximation, note that the unwanted images in FIG. 4 have been removed, and the streaks can indicate the movement of flies.

To generate a binary image, the background approximation is subtracted from a frame of the movie. By subtracting the background approximation from a frame, the binary image of the frame captures the moving elements of the frame. Additionally, a gray-scale threshold can be applied to the frames of the movie. For example, if a pixel in a frame is darker than the threshold, it is represented as being white in the binary image. If a pixel in the frame is lighter than the threshold, it is represented as being black in the binary image. More particularly, if the difference between an image pixel value and the background pixel value is less than the difference between a threshold value and the value of a white pixel (i.e., [Image Pixel Value]−[Background Pixel Value]<[Threshold Value]−[Pixel Value of White Pixel]), then the binary image pixel is set as white. For example, if the pixel value of a black pixel is assumed to be 0 and a white pixel is assumed to be 255, an exemplary threshold value of 230 can be used.

Figure 6:
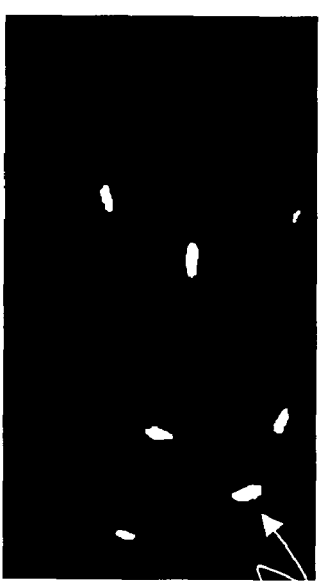
FIG. 6 depicts an exemplary binary image of an exemplary frame of a digitized movie.

With reference again to FIG. 3, in step 140, the image blocks in the frames of the movie are screened by pixel size. More particularly, image blocks in a frame having an area greater than a maximum threshold or less than a minimum threshold are removed from the binary image. For example, FIG. 6 depicts an exemplary binary image, which was obtained by subtracting the background approximation depicted in FIG. 5 from the exemplary frame depicted in FIG. 4 and removing image blocks in the frames having areas greater than 1600 pixels or less than 30 pixels. The image blocks are also screened for eccentricity. As used herein, "eccentricity" refers to the relationship between width and length of an image block. For example, where a biological specimen of the invention is a fly, the accepted eccentricity values range between 1 and 5 (that is, the ratio of width to length is within a range of 1 to 5). The eccentricity value of a given biological specimen can be determined empirically by one of skill in the art based on the average width and length measurements of the specimen. Once the eccentricity value of a given biological specimen is determined, that value will be permitted to increase by a doubling of the value or decrease by half the value, and still be considered to be within the acceptable range of eccentricity values for the particular biological specimen. Image blocks which fall outside the accepted eccentricity value for a given biological specimen (or sample of plural biological specimens) will be excluded from the analysis (i.e., blocks that are too long and/or narrow to be a fly are excluded).

Figure 7:
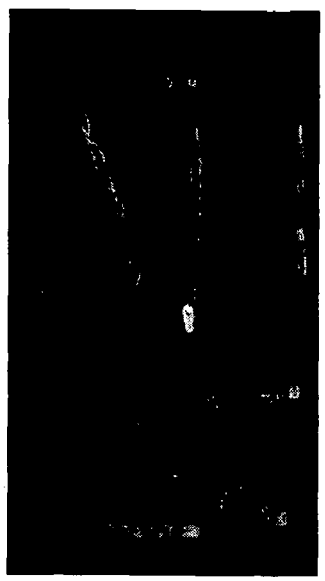
FIG. 7 depicts a normalized sum of an exemplary binary image of an exemplary frame of a digitized movie.

As depicted in FIG. 6, the image blocks 144 that may correspond to specimens, and more specifically flies in this present exemplary application, can be more easily identified in the binary image. FIG. 7 depicts a normalized sum of the binary images of the frames of the movie, which can provide an indication of the movements of the flies during the movie. In FIGS. 6 and 7, image blocks 144 are depicted as being white, and the background depicted as being black. It should be noted, however, that image blocks 144 can be black, and the background white.

With reference to FIG. 3, in step 142, data on image blocks 144 (FIG. 6) are collected and stored. In one exemplary embodiment, the collected and stored data can include one or more characteristics of image blocks 144 (FIG. 6), such as length, width, location of the center, area, and orientation.

Figure 8:
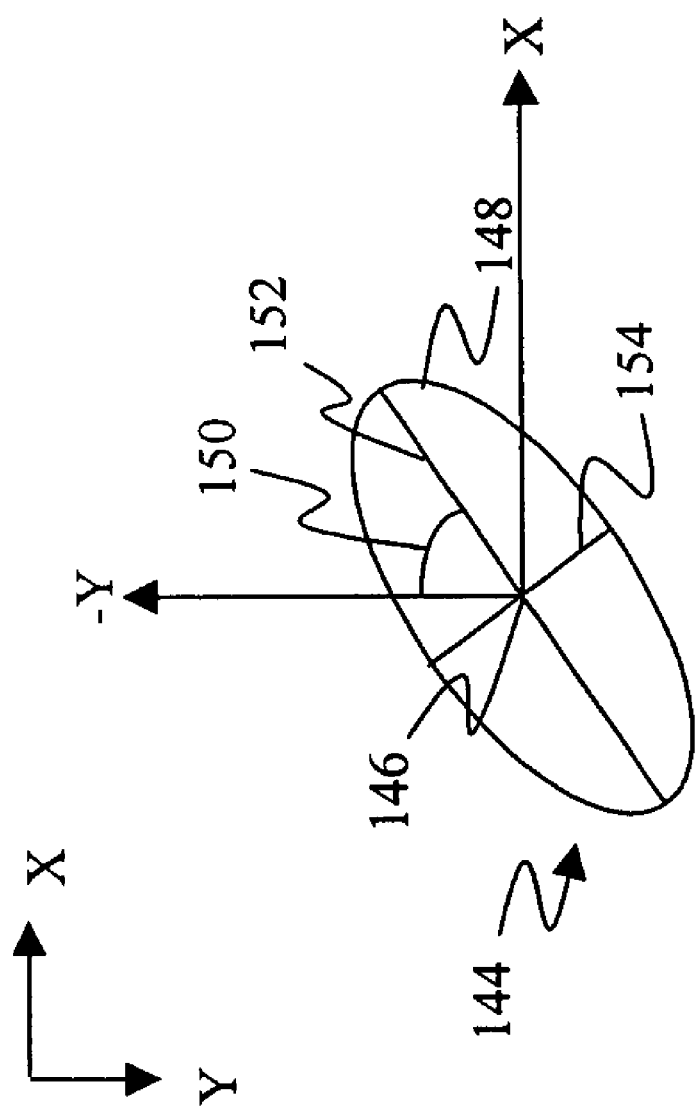
FIG. 8 depicts an exemplary image block.

With reference to FIG. 8, a long axis 152 and a short axis 154 for image block 144 can be determined based on the shape and geometry of image block 144. The length of long axis 152 and the length of short axis 154 are stored as the length and width, respectively, of image block 144.

A center 146 can be determined based on the center of gravity of the pixels for image block 144. The center of gravity can be determined using the image moment for an image block 144, according to methods which are well established in the art. The location of center 146 can then be determined based on a coordinate system for the frame. With reference to FIG. 1, in the present example, camera 124 is tilted such that the frames captured by camera 124 are rotated 90 degrees. As such, as indicated by the coordinate system used in FIG. 8, in the frames captured by camera 124, the top and bottom of specimen container 104 is located on the left and right sides, respectively, of the frame. Furthermore, as indicated by the coordinate system used in FIG. 8, for the purpose of tracking the movement of image blocks 144, the X-axis corresponds to the length of specimen container 104 (FIG. 1), where the zero X position corresponds to a location near the top of specimen container 104 (FIG. 1). The Y-axis corresponds to the width of specimen container 104 (FIG. 1), where the zero Y position corresponds to a location near the right edge of specimen container 104 (FIG. 1) as depicted in FIG. 1. Thus, when a fly moves from the bottom of specimen container 104 (FIG. 1) toward the top, it moves in a negative X direction. When the fly moves from left to right in the specimen container 104 (FIG. 1), it moves in a negative Y direction. In one exemplary embodiment, the zero X and Y position is the upper left corner of a frame. It should be noted that the labeling of the X and Y axes is arbitrary and provided for the sake of convenience and clarity.

With reference to FIG. 8, an area 148 can be determined based on the shape and geometry of image block 144. For example, area 148 can be defined as the number of pixels that fall within the bounds of image block 144. It should be noted that area 148 can be determined in various manners and defined in various units.

An orientation 150 can be determined based on long axis 152 for image block 144. For example, as depicted in FIG. 8, orientation 150 can be defined as an angle long axis 152 of image block 144 and an axis of the coordinate system of the frame, such as the Y axis as depicted in FIG. 8. It should be noted that orientation 150 can be determined and defined in various manners.

In one exemplary embodiment, data for image blocks 144 in each frame of the movie are first collected and stored. As described below, trajectories of the image blocks 144 are then determined for the entire movie. Alternatively, data for image blocks 144 and the trajectories of the image blocks 144 can be determined frame-by-frame.

C. Trajectory

Figure 9:
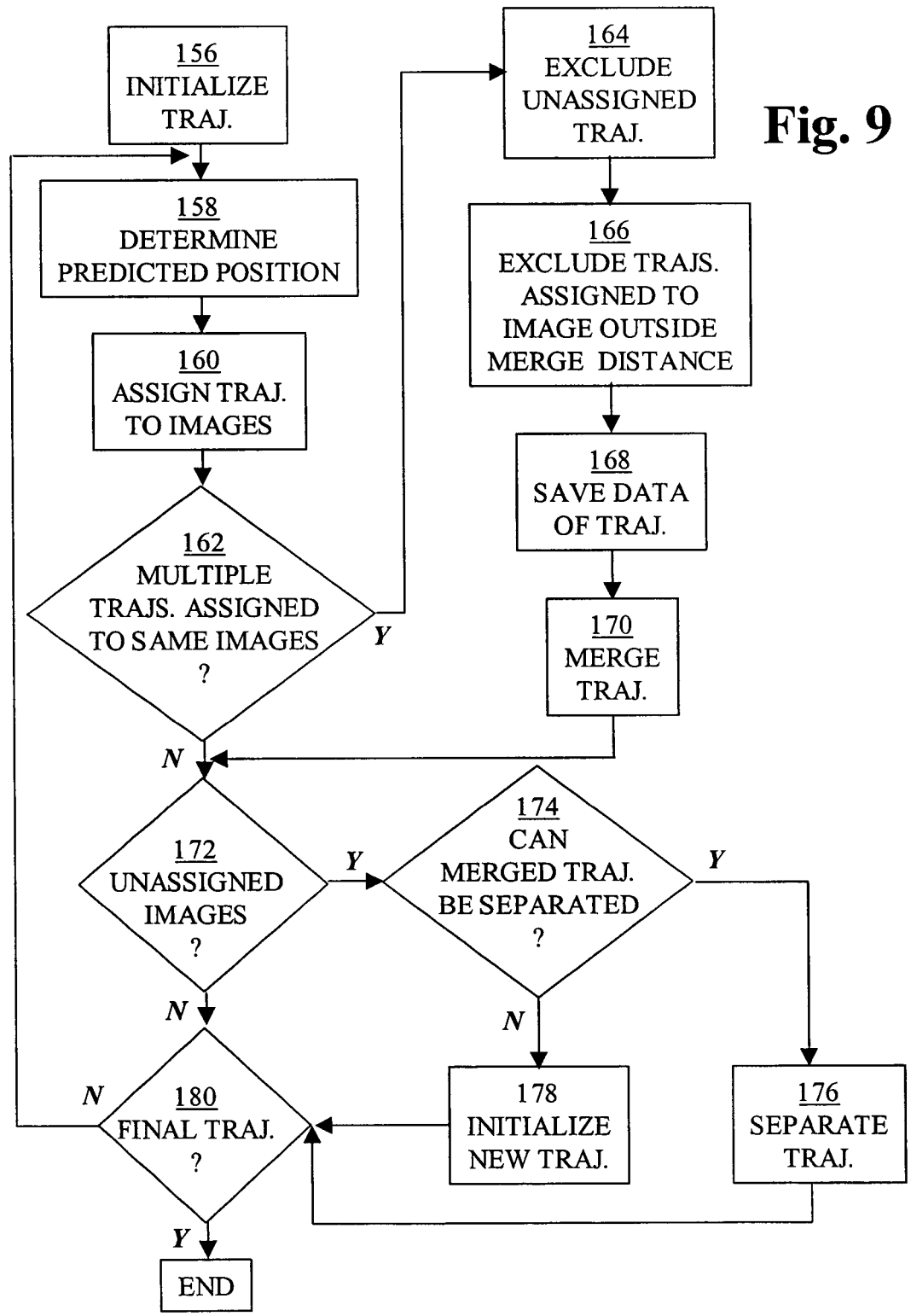
FIG. 9 is an exemplary process for tracking motion of specimens captured by a digitized movie.

With reference again to FIG. 2, in the present embodiment, in step 134, the movements of the specimens in the movie are tracked. More particularly, FIG. 9 depicts an exemplary process for tracking the movements of the specimens in the movie. In one exemplary embodiment, the exemplary process depicted in FIG. 9 can be implemented in a computer program.

In step 156, for the first frame of the movie, trajectories of image blocks 144 (FIG. 6) are initialized. More specifically, a trajectory is initialized for each image block 144 identified in the first frame. The trajectory includes various data, such as the location of the center, area, and orientation of image block 144. The trajectory also includes a velocity vector, which is initially set to zero.

In step 158, a predicted position is determined. For example, the predicted position of an image block 144 (FIG. 6) and/or trajectory can be determined based on its previous position and velocity vector. More specifically, in one configuration, the predicted position can be determined as: [Predicted Position]=[Previous Position]+[Prediction Factor]×[Previous Velocity Vector], where the prediction factor can vary between zero and one.

For example, with reference to FIG. 10, assume that in one frame a trajectory having a center position 182 and a velocity vector 184 has been initialized based on image block 144. If the prediction factor is zero, the predicted position in the next frame would be the previous center position 182. If the prediction factor is one, the prediction position in the next frame would be position 186. In one exemplary embodiment, a prediction factor of zero is used, such that the predicted position is the same as the previous position. However, the prediction factor used can be adjusted and varied depending on the particular application.

Additionally, a predicted velocity can be determined based on the previous velocity vector. For example, the predicted velocity can be determined to be the same as the previous velocity.

With reference to FIG. 9, in step 160, the next frame of the movie is loaded and the trajectories are assigned to image blocks 144 (FIG. 6) in the new frame. More specifically, each trajectory of a previous frame is compared to each image block 144 (FIG. 6) in the new frame. If only one image block 144 (FIG. 6) is within a search distance of a trajectory, and more specifically within the predicted position of the trajectory, then that image block 144 (FIG. 6) is assigned to that trajectory. If none of the image blocks 144 (FIG. 6) are within the search distance of a trajectory, that trajectory is unassigned and will be hereafter referred to as an "unassigned trajectory." However, if more than one image block 144 (FIG. 6) falls within the search distance of a trajectory, and more specifically within the predicted position of the trajectory, the image block 144 (FIG. 6) closest to the predicted position of that trajectory is assigned to the trajectory.

For example, in one exemplary embodiment, if more than one image block 144 (FIG. 6) falls within the search distance of a trajectory, a distance between each of the image blocks 144 (FIG. 6) and the trajectory can be determined based on the position of the image block 144 (FIG. 6), the prediction position of the trajectory, a speed factor, the velocity of the image block 144 (FIG. 6), and the predicted velocity of the trajectory. More particularly, the distance between each image block 144 (FIG. 6) and the trajectory can be determined as the value of: norm([Position of the image block]–[Predicted position of the image block]+[Speed factor]*norm([Velocity]–[Predicted Velocity])). A norm function is the length of a two-dimensional vector, meaning that only the magnitude of a vector is used. The speed factor can be varied from zero to one, where zero corresponds to ignoring the velocity of the image block and one corresponds to giving equal weight to the velocity and the position of the image block. In the present exemplary embodiment, the image block 144 (FIG. 6) having the shortest distance is assigned to the trajectory. Additionally, a speed factor of 0.5 is used.

With reference to FIG. 11A, assume that in one frame a trajectory having a center position 188 and a velocity vector 190 has been initialized based on image block 144. With reference to FIG. 11B, in the next frame, the trajectory, which is now depicted as trajectory 196, is assigned to an image block 144. Assuming that a prediction factor of zero is used, a search distance 198 associated with trajectory 196 is centered about the previous center position 188 (FIG. 11A). Thus, in the example depicted in FIG. 11B, image block 192 is assigned to trajectory 196, while image block 194 is not. In one exemplary embodiment, a search distance of [350 pixels per second]/[frame rate] is used, where the frame rate is the frame rate of the movie. For example, if the frame rate is 5 frames per second, then the search distance is 70 pixels/frame. It should be noted that various search distances can be used depending on the application.

With reference to FIG. 9, in step 162, the trajectories of the current frame are examined to determine if multiple trajectories have been assigned to the same image block 144 (FIG. 6). For example, with reference to FIG. 12, assume that image block 144 lies within search distance 204 of trajectories 200 and 202. As such, image block 144 is assigned to trajectories 200 and 202.

With reference to FIG. 9, in step 164, unassigned trajectories are excluded from being merged. More particularly, multiple trajectories assigned to an image block 144 (FIG. 6) are examined to determined if any of the trajectories were unassigned trajectories in the previous frame. The unassigned trajectories are then excluded from being merged.

In step 166, trajectories assigned to an image block 144 outside of a merge distance are excluded from being merged. For example, with reference to FIG. 12, assume that a merge distance 206 is associated with trajectories 200 and 202. If image block 144 does not lie within merge distance 206 of trajectories 200 and 202, the two trajectories are excluded from being merged. If image block 144 does lie within merge distance 206 of trajectories 200 and 202, the two trajectories are merged. In one exemplary embodiment, a merge distance of [250 pixels per second]/[frame rate] is used. As such, if the frame rate if 5 frames per second, then the merge distance is 50 pixels/frame.

One of skill in the art will appreciate that a separation distance, merge distance, and search distance used in the methods of the invention may be modified depending on the particular biological specimen to be analyzed, frame rate, image magnification, and the like. In empirically determining a search, merge, and separation distance for a given biological specimen, one of skill in the art will appreciate that the value used is based on an anticipated distance which a specimen will move between frames of the movie, and will also vary with the size of the specimen, and the speed at which the frames of the movie are acquired.

With reference to FIG. 9, in step 168, for trajectories that were not excluded in steps 164 and 166, data for the trajectories are saved. More particularly, an indication that the trajectories are merged is stored. Additionally, one or more characteristics of the image blocks 144 (FIG. 12) associated with the trajectories before being merged is saved, such as area, orientation, and/or velocity. As described below, this data can be later used to separate the trajectories. In step 170, the multiple trajectories are then merged, meaning that the merged trajectories are assigned to the common image block 144 (FIG. 12).

For example, FIGS. 13A to 13C depict three frames of a movie where two flies converge. Assume that FIGS. 14A to 14C depict binary images of the frames depicted in FIGS. 13A to 13C, respectively.

In FIG. 14A, two image blocks 208 and 212 are identified, which correspond to the two flies depicted in FIG. 13A. Assume that trajectories 210 and 214 were assigned to image blocks 208 and 212, respectively, in a previous frame. As such, the data for trajectory 210 includes characteristics of image block 205, such as area, orientation, and/or velocity. Similarly, the data for trajectory 214 includes characteristics of image block 212, such as area, orientation, and/or velocity.

As depicted in FIG. 14B, assume that the two flies depicted in FIG. 13B are in sufficient proximity that in the binary image of the frame that a single image block 216 is identified. As also depicted in FIG. 14B, image block 216 lies within search distance 218 of trajectories 210 and 214. As such, image block 216 is assigned to trajectories 210 and 214. Additionally, assume that image block 216 falls within the merge distance of trajectories 210 and 214. As such, in accordance with step 168 (FIG. 9), data for trajectories 210 and 214 are saved. More specifically, one or more characteristics of image blocks 208 and 212 (FIG. 14A) are stored for trajectories 210 and 214, respectively. In accordance with step 170

(FIG. 9), trajectories 210 and 214 are merged, meaning that they are associated with image block 216.

As depicted in FIG. 14C, assume that the two flies depicted in FIG. 13C remain in sufficient proximity that in the binary image of the frame that a single image block 220 is identified. As such, trajectories 210 and 214 (FIG. 14B) remain merged. As also depicted in FIG. 14C, image block 220 can have a different shape, area, and orientation than image block 216 in FIG. 14B. Now assume that velocity vector 222 is calculated based on the change in the position of the center of image block 220 from the position of the center of image block 216 (FIG. 14B). As such, the data of the trajectory of image block 220 is appropriately updated.

Although in the above example two trajectories corresponding to two flies are merged, it should be noted that any number of trajectories corresponding to any number of flies (or any other biological specimen) can be merged. For example, rather than two flies crossing paths as depicted in FIGS. 13A to 13C, three or more flies can converge.

As noted above, with reference again to FIG. 9, in step 166, trajectories that are determined to have been unassigned trajectories in the previous frame are excluded from being merged with other trajectories. For example, with reference to FIG. 12, if trajectory 202 is determined to have been an unassigned trajectory in the previous frame, meaning that it had not been assigned to any image block 144 (FIG. 6) in the previous frame, then trajectory 202 is not merged with trajectory 200. Instead, in one embodiment, trajectory 200 is assigned to image block 144 (FIG. 6), while trajectory 202 remains unassigned.

Now assume that FIGS. 15A to 15D depict the movement of a fly over four frames of a movie. More specifically, assume that during the four frames the fly begins to move, comes to a stop, and then moves again.

Figure 15D:
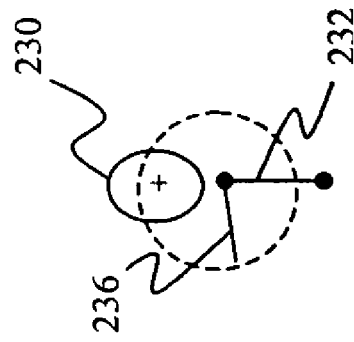
FIGS. 15A to 15D depict exemplary binary images.
Figure 15C:
Figure 15B:
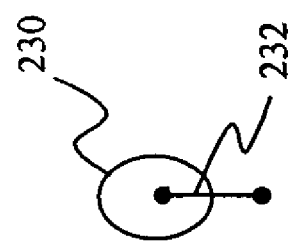
Figure 15A:
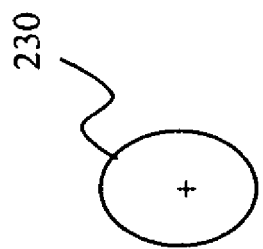

Assume FIG. 15A depicts the first frame. As such, a trajectory corresponding to image block 230 is initialized. As depicted in FIG. 15B, assume that the fly has moved and that image block 230 is the only image block that falls within the search distance of the trajectory that was initialized based on image block 230 in the earlier frame depicted in FIG. 5A. As such, trajectory 232 is assigned to image block 230 and the data for trajectory 232 is updated with the new location of the center, area, and orientation of image block 230. Additionally, a velocity vector is calculated based on the change in location of the center of image block 230.

Now assume that the fly comes to a stop. As described above, in one exemplary embodiment, a background approximation is calculated and subtracted from each frame of the movie. As also described above, flies that do not move throughout the movie are averaged out with the background approximation. As such, when a fly comes to a stop, the image block of that fly will decrease in area. Indeed, if the fly remains stopped, the image block can decrease until it disappears. Additionally, a fly can also physically leave the frame.

As depicted in FIG. 15C, assume in the present example that the fly has remained stopped sufficiently long enough that image block 230 (FIG. 15B) has disappeared in the present frame. As such, trajectory 232 becomes an unassigned trajectory.

Now assume that the fly begins to move again. As such, as depicted in FIG. 15D, image block 230 is identified. Now assume that the area of image block 230 is sufficiently large that image block 230 lies within search distance 236 of trajectory 232. As such, trajectory 232 now becomes assigned to image block 230.

With reference now to FIG. 9, in step 172, image blocks 144 (FIG. 6) in the current frame are examined to determine if any remain unassigned. In step 174, the unassigned image blocks are used to determine if any merged trajectories can be separated. More specifically, if an unassigned image block falls within a separation distance of a merged trajectory, one or more characteristics of the unassigned image block is compared with one or more characteristics that were stored for the trajectories prior to the trajectories being merged to determine if any of the trajectories can be separated from the merged trajectory.

For example, in one exemplary embodiment, the area of the unassigned image block can be compared to the areas of the image blocks associated with the trajectories before the trajectories were merged. As described above, this data was stored before the trajectories were merged. The trajectory with the stored area closest to the area of the unassigned image block can be separated from the merged trajectory and assigned to the unassigned image block. Alternatively, if the stored area of a trajectory and that of the unassigned image block are within a difference threshold, then that trajectory can be separated from the merged trajectory and assigned to the unassigned image block.

It should be noted that orientation or velocity can be used to separate trajectories. Additionally, a combination of characteristics can be used to separate trajectories. Furthermore, if a combination of characteristics is used, then a weight can be assigned to each characteristic. For example, if a combination of area and orientation is used, the area can be assigned a greater weight than the orientation.

As described above, FIGS. 13A to 13C depict three frames of a movie where two flies converge, and FIGS. 14A to 14C depict binary images of the frames depicted in FIGS. 13A to 13C. Similarly, FIGS. 13D and 13E depict two frames of the movie where the two flies diverge, and FIGS. 14D and 14E depict binary images of the frames depicted in FIGS. 13D and 13E.

As described above, a merged trajectory was created based on the merging of image blocks 208 and 212 (FIG. 14A) into image blocks 216 (FIG. 14B) and 220 (FIG. 14C). Assume that in FIG. 14D, the merged trajectories remain merged for image block 224. However, in FIG. 14E, assume that the flies have separated sufficiently that an image block 226 is identified apart from image block 228. Additionally, assume that in the frame depicted in FIG. 14E image block 226 is not assigned to a trajectory, but falls within the separation distance of the merged trajectory. As such, in accordance with step 174, one or more characteristics of image block 226 is compared with the stored data of the merged trajectories. More specifically, in accordance with the exemplary embodiment described above, the area of image block 226 is compared with the stored areas of image blocks 208 and 212 (FIG. 14A), which correspond to the image blocks that were associated with trajectories 210 and 214 (FIG. 14B), respectively, before the trajectories were merged. In this example, the stored area image block 212 (FIG. 14A), which corresponds to trajectory 214 (FIG. 14B) before it was merged with trajectory 210 (FIG. 14B), most closely matches the area of image block 226. As such, trajectory 214 (FIG. 14B) is separated from the merged trajectory and assigned to image block 226.

With reference again to FIG. 9, in step 178, if an unassigned image block does not fall within the separation distance of any merged trajectory, then a new trajectory is initialized for the unassigned image blocks. In one embodiment, a separation distance of 300/[frame rate], where the frame rate is the frame rate of the movie, is used. It should be noted, however, that various separation distances can be used.

In step 180, if the final frame has not been reached, then the motion tracking process loops to step 158 and the next frame is processed. If the final frame has been reached, then the motion tracking process is ended.

Figure 16:
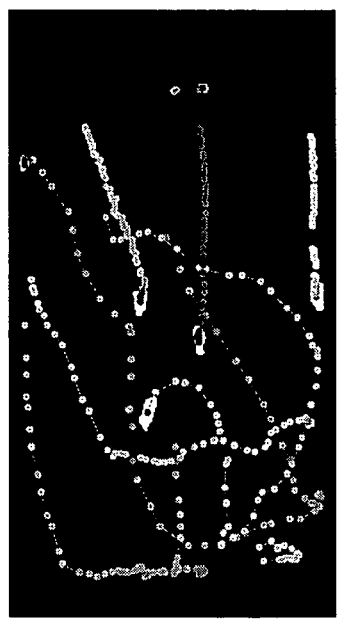
FIG. 16 depicts exemplary trajectories.

In this manner, with reference to FIG. 1, the movements of the biological specimens within specimen container 104 as captured by camera 124 can be processed. For example, FIG. 16 depicts the trajectories of the flies depicted in FIG. 4.

E. Analysis of Movement

Having thus tracked the movements of the specimens within specimen container 104, the movements can then be analyzed for various characteristics and/or traits. For example, in one embodiment, various statistics on the movements of the specimens, such as the x and y travel distance, path length, speed, turning, and stumbling, can be calculated. These statistics can be determined for each trajectory and/or averaged for a population, such as for all the specimens in a specimen container 104).

The present invention provides for the analysis of the movement of a plurality of biological specimens, and further contemplates that the measurements made of a biological specimen may additionally include other physical trait data. As used herein, "physical trait data" refers to, but is not limited to, movement trait data (e.g., animal behaviors related to locomotor activity of the animal), and/or morphological trait data, and/or behavioral trait data. Examples of such "movement traits" include, but are not limited to:

a) total distance (average total distance traveled over a defined period of time);
b) X only distance (average distance traveled in X direction over a defined period of time;
c) Y only distance (average distance traveled in Y direction over a defined period of time);
d) average speed (average total distance moved per time unit);
e) average X-only speed (distance moved in X direction per time unit);
f) average Y-only speed (distance moved in Y direction per time unit);
g) acceleration (the rate of change of velocity with respect to time);
h) turning;
i) stumbling;
j) spatial position of one animal to a particular defined area or point (examples of spatial position traits include (1) average time spent within a zone of interest (e.g., time spent in bottom, center, or top of a container; number of visits to a defined zone within container); (2) average distance between an animal and a point of interest (e.g., the center of a zone); (3) average length of the vector connecting two sample points (e.g., the line distance between two animals or between an animal and a defined point or object); (4) average time the length of the vector connecting the two sample points is less than, greater than, or equal to a user define parameter; and the like);
m) path shape of the moving animal, i.e., a geometrical shape of the path traveled by the animal (examples of path shape traits include the following: (1) angular velocity (average speed of change in direction of movement); (2) turning (angle between the movement vectors of two consecutive sample intervals); (3) frequency of turning (average amount of turning per unit of time); (4) stumbling or meandering (change in direction of movement relative to the distance); and the like. This is different from stumbling as defined above. Turning parameters may include smooth movements in turning (as defined by small degrees rotated) and/or rough movements in turning (as defined by large degrees rotated).

"Movement trait data" as used herein refers to the measurements made of one or more movement traits. Examples of "movement trait data" measurements include, but are not limited to X-pos, X-speed, speed, turning, stumbling, size, T-count, P-count, T-length, Cross150, Cross250, and F-count. Descriptions of these particular measurements are provided below.

X-Pos: The X-Pos score is calculated by concatenating the lists of x-positions for all trajectories and then computing the average of all values in the concatenated list.

X-Speed: The X-Speed score is calculated by first computing the lengths of the x-components of the speed vectors by taking the absolute difference in x-positions for subsequent frames. The resulting lists of x-speeds for all trajectories are then concatenated and the average x-speed for the concatenated list is computed.

Speed: The Speed score is calculated in the same way as the X-Speed score, but instead of only using the length of the x-component of the speed vector, the length of the whole vector is used. That is, [length]=square root of ([x-length]$^2$+[y-length]$^2$).

Turning: The Turning score is calculated in the same way as the Speed score, but instead of using the length of the speed vector, the absolute angle between the current speed vector and the previous one is used, giving a value between 0 and 90 degrees.

Stumbling: The Stumbling score is calculated in the same way as the Speed score, but instead of using the length of the speed vector, the absolute angle between the current speed vector and the direction of body orientation is used, giving a value between 0 and 90 degrees.

Size: The Size score is calculated in the same way as the Speed score, but instead of using the length of the speed vector, the size of the detected fly is used.

T-Count: The T-Count score is the number of trajectories detected in the movie.

P-Count: The P-Count score is the total number of points in the movie (i.e., the number of points in each trajectory, summed over all trajectories in the movie).

T-Length: The T-Length score is the sum of the lengths of all speed vectors in the movie, giving the total length all flies in the movie have walked.

Cross150: The Cross150 score is the number of trajectories that either crossed the line at x=150 in the negative x-direction (from bottom to top of the vial) during the movie, or that were already above that line at the start of the movie. The latter criteria was included to compensate for the fact that flies sometimes don't fall to the bottom of the tube. In other words this score measures the number of detected flies that either managed to hold on to the tube or that managed to climb above the x=150 line within the length of the movie.

Cross250: The Cross250 score is equivalent to the Cross150 score, but uses a line at x=250 instead.

F-Count: The F-Count score counts the number of detected flies in each individual frame, and then takes the maximum of these values over all frames. It thereby measures the maximum number of flies that were simultaneously visible in any single frame during the movie.

The assignment of directions in the X-Y coordinate system is arbitrary. For purposes of this disclosure, "X" refers to the vertical direction (typically along the long axis of the container in which the flies are kept) and "Y" refers to movement in the horizontal direction (e.g., along the surface of the vial).

For each of the various trait parameters described, statistical measures can be determined. See, for example, PRINCIPLES OF BIOSTATISTICS, second edition (2000) Mascello et al., Duxbury Press. Examples of statistics per trait parameter include distribution, mean, variance, standard deviation, standard error, maximum, minimum, frequency, latency to first occurrence, latency to last occurrence, total duration (seconds or %), mean duration (if relevant).

Certain other traits (which may involve animal movement) can be termed "behavioral traits." Examples of behavioral traits include, but are not limited to, appetite, mating behavior, sleep behavior, grooming, egg-laying, life span, and social behavior traits, for example, courtship and aggression. Social behavior traits may include the relative movement and/or distances between pairs of simultaneously tracked animals. Such social behavior trait parameters can also be calculated for the relative movement of an animal or between animal(s) and zones/points of interest. Accordingly, "behavioral trait data" refers to the measurement of one or more behavioral traits. Examples of such social behavior trait traits include, for example, the following:

a) movement of one animal toward or away from another animal;

b) occurrence of no relative spatial displacement of two animals;

c) occurrence of two animals within a defined distance from each other;

d) occurrence of two animals more than a defined distance away from each other.

In addition to traits based on specimen movement and/or behavior, other traits of the specimens may be determined and used for comparison in the methods of the invention, such as morphological traits. As used herein, "morphological traits" refer to, but are not limited to gross morphology, histological morphology (e.g., cellular morphology), and ultrastructural morphology. Accordingly, "morphological trait data" refers to the measurement of a morphological trait. Morphological traits include, but are not limited to, those where a cell, an organ and/or an appendage of the specimen is of a different shape and/or size and/or in a different position and/or location in the specimen compared to a wild-type specimen or compared to a specimen treated with a drug as opposed to one not so treated. Examples of morphological traits also include those where a cell, an organ and/or an appendage of the specimen is of different color and/or texture compared to that in a wild-type specimen. An example of a morphological trait is the sex of an animal (i.e., morphological differences due to sex of the animal). One morphological trait that can be determined relates to eye morphology. For example, neurodegeneration is readily observed in a *Drosophila* compound eye, which can be scored without any preparation of the specimens (Femandez-Funez et al., 2000, *Nature* 408:101-106; Steffan et. al, 2001, *Nature* 413:739-743). This organism's eye is composed of a regular trapezoidal arrangement of seven visible rhabdomeres produced by the photoreceptor neurons of each *Drosophila ommatidium*. Expression of mutant transgenes specifically in the *Drosophila* eye leads to a progressive loss of rhabdomeres and subsequently a rough-textured eye (Femandez-Funez et al., 2000; Steffan et. al, 2001). Administration of therapeutic compounds to these organisms slows the photoreceptor degeneration and improves the rough-eye phenotype (Steffan et. al, 2001). In one embodiment, animal growth rate or size is measured. For example *Drosophila* mutants that lack a highly conserved neurofibromatosis-1 (NF1) homolog are reduced in size, which is a defect that can be rescued by pharmacological manipulations that stimulate signalling through the cAMP-PKA pathway (The et al., 1997, *Science* 276:791-794; Guo et al., 1997, *Science* 276:795-798).

Traits exhibited by the populations may vary, for example, with environmental conditions, age of a specimen and/or sex of a specimen. For traits in which such variation occurs, assay and/or apparatus design can be adjusted to control possible variations. Apparatus for use in the invention can be adjusted or modified so as to control environmental conditions (e.g., light, temperature, humidity, etc.) during the assay. The ability to control and/or determine the age of a fly population, for example, is well known in the art. For those traits which have a sex-specific bias or outcome, the system and software used to assess the trait can sort the results based a detectable sex difference in of the specimens. For example, male and female flies differ detectably in body size. Thus, analysis of sex-specific traits need not require separated male and/or female populations. However, sex-specific populations of specimens can be generated by sorting using manual, robotic (automated) and/or genetic methods as known in the art. For example, a marked-Y chromosome carrying the wild-type allele of a mutation that shows a rescuable maternal effect lethal phenotype can be used. See, for example, Dibenedetto et al. (1987) *Dev. Bio.* 119:242-251.

In the present embodiment, x and y travel distances can be determined based on the tracked positions of the centers of image blocks 144 (FIG. 6) and/or the velocity vectors of the trajectories. As noted above, the x and y travel distance for each trajectory can be determined, which can indicate the x and y travel distance of each specimen within specimen container 104. Additionally or alternatively, an average x and y travel distance for a population, such as all the specimens in a specimen container 104, can be determined.

Path length can also be determined based on the tracked positions of the centers of image blocks 144 (FIG. 6) and/or the velocity vectors of the trajectories. Again, a path length for each trajectory can be determined, which can indicate the path length for each specimen within specimen container 104. Additionally or alternatively, an average path length for a population, such as all the specimens in a specimen container 104, can be determined.

Speed can be determined based on the velocity vectors of the trajectories. An average velocity for each trajectory can be determined, which can indicate the average speed for each specimen within specimen container 104. Additionally or alternatively, an average speed for a population, such as all the specimens in a specimen container 104, can be determined.

Figure 17:
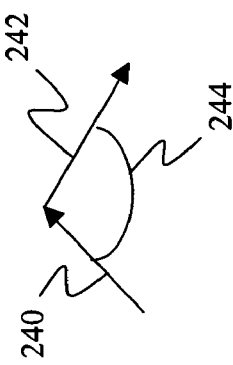
FIG. 17 depicts an exemplary amount of turning.

Turning can be determined as the angle between two velocity vectors of the trajectories. As used herein, "turning" refers to a change in the direction of the trajectory of a specimen such that a second trajectory is different from a first trajectory. Turning may be determined by detecting the existence of an angle 374 between the velocity vector of a first frame and a second frame. More specifically, "turning" may be determined herein as an angle 374 of at least 1°, preferably greater than 2°, 5°, 10°, 20°, 30°, 40°, 50°, and up to or greater than 90°. For example, with reference to FIG. 17, assume that velocity vector 240 was determined based on the movement of a specimen between frames 1 and 2; and velocity vector 242 was determined based on the movement of the specimen between frames 2 and 3. As such, in this example, angle 244 defines the amount of turning captured in frames 1, 2, and 3. In this manner, the amount of turning for each trajectory can be determined, which can indicate the amount of turning for each specimen within specimen container 104. Additionally or alternatively, an average amount of turning for a population, such as all the specimens in a specimen container 104, can be determined.

Figure 18A:
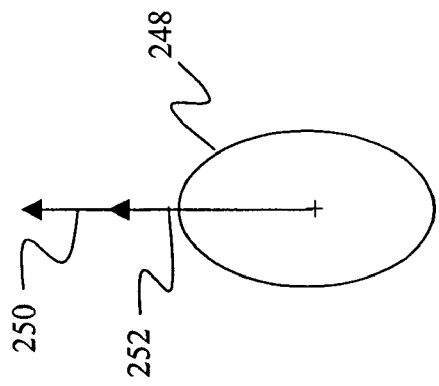
FIGS. 18A and 18B depict an exemplary amount of stumbling.
Figure 18B:
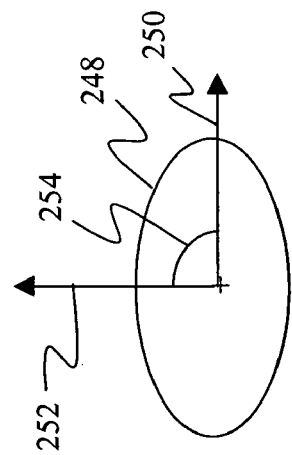

Stumbling can be determined as the angle between the orientation of a image block 144 (FIG. 6) and the velocity vector of the image block 144 (FIG. 6) of the trajectories. Accordingly, "stumbling" as used herein refers to a difference between the direction of the orientation vector and the velocity vector of a biological specimen. "Stumbling" may be determined according to the invention, by the presence of an angle between the orientation vector and velocity vector of a biological specimen of at least 1°, preferably greater than 2°, 5°, 10°, 20°, 40°, 60°, and up to or greater than 90°. For example, with reference to FIG. 18A, assume that orientation 250 and velocity vector 252 of an image block 248 of a trajectory are aligned (i.e., the angle between orientation 250 and velocity vector 252 is zero degrees). As such, in this instance, the amount of stumbling is zero, and thus at a minimum. With reference to FIG. 18B, now assume that orientation 250 and velocity vector 252 of image block 248 of a trajectory are perpendicular (i.e., the angle between orientation 250 and velocity vector 252 is 90 degrees). As such, in this instance, amount of stumbling defined by angle 254 is 90 degrees, and thus at a maximum. In this manner, the amount of stumbling for each trajectory can be determined, which can indicate the amount of stumbling for each specimen within specimen container 104. Additionally or alternatively, an average amount of stumbling for a population, such as all the specimens in a specimen container 104, can be determined.

Phenoprofiles

As discussed above, the term "phenoprofile" refers to a trait or, more usually, a combination of traits exhibited by a population of specimens (i.e., insects). Where the trait or combination of traits is exhibited by a population following exposure to a test agent it is referred to as an "agent phenoprofile" and the phenoprofile exhibited by a reference population is referred to as a "reference phenoprofile". The traits are described by a quantitative or qualitative value. For illustration, three hypothetical phenoprofiles with arbitrary units are shown in Table 1.

TABLE 1

| | Phenoprofiles | | |
|---|---|---|---|
| Trait measured | Test Population 1 | Test Population 2 | Reference Population |
| x-only speed | 5 | 1 | 6 |
| stumbling | 12 | 25 | 10 |
| path length | 100 | 25 | 100 |
| turning | 45 | 50 | 66 |

Usually, the phenoprofile is defined by measurements of at least 2, at least 3, at least 4, at least 5, at least 7 or at least 10 traits. The traits can be solely movement traits, solely behavioral traits, solely morphological traits or a mixture of traits in multiple categories. In some embodiments the phenoprofile is determined by measurement of at least 2, at least 3, at least 4, often at least 5, and sometimes at least 7 movement traits.

In one embodiment, a trait and/or phenoprofile is determined for an animal population as a whole. In such a case the result for one population can be compared to the result for another population. In another embodiment, a trait and/or phenoprofile is determined for individual animals in a population. For example, when a social behavior trait is evaluated, relationship between individuals of the population is determined and used to generate a phenoprofile.

An example of the measurement of a phenoprofile for a population of flies is shown below in Example 3. In this example, *Drosophila* expressing a mutant form of human Huntingtin are compared to mutant flies which have been exposed to a potentially therapeutic drug, and further compared against a reference (wild-type) population of flies. The phenoprofile of the flies in this example is quantitated based on the Cross150 score, which is the number of trajectories (flies) which cross a position at x=150 in the negative x-direction. The phenoprofile of the flies described in Example 3 is based further on measurements of speed, T-length, turning and stumbling. Example 4 provides an example of the phenoprofile measured in a different population of flies, that is, flies which comprise a polyglutamine repeat present in the Sca1 locus (thus recapitulating spinocerebellar ataxia-1). The phenoprofile of these flies is based on the quantitation of the Cross150 score. Accordingly, one of skill in the art will appreciate that for a given population of specimens to be analyzed, any measurement or combination of measurements of movement, behavior, or morphology as described herein may be used to determine a phenoprofile for a given population, regardless of whether the phenoprofile is based on the measurement of one trait (e.g., Cross150) or a plurality of traits (e.g., Cross150, speed, turning, stumbling, and T-length).

Comparisons of Phenoprofiles

Phenoprofiles can be determined for a large number of test populations as well as for reference populations. In one aspect of the invention, the phenoprofiles of test and/or reference populations are compared with each other.

Since the traits that define phenoprofiles can be stored electronically, comparison of phenoprofiles is conveniently accomplished using computer implemented multivariate analysis. It should be noted that the multivariate analysis can be implemented using any commercially available multivariate analysis package, such as Spotfire DecisionSite, which is available from Spotfire of Somerville, Mass. (SPOTFIRE is a registered trademark). Alternatively, a custom multivariate analysis algorithm can be developed and applied to the recorded traits.

Comparison of phenoprofiles can be carried out to achieve several different goals. In one embodiment, a plurality of agent phenoprofiles are ranked according to their similarity to a reference phenoprofile. Such ranking can be used to screen or rank agent according to their biological effect on the animals. For example, and not limitation, if the test populations comprise flies exhibiting traits of a neurodegenerative condition, test agents can be screened for the ability to ameliorate the symptoms of the condition by (1) comparing the phenoprofiles of test populations exposed to various test agents with a reference phenoprofile of a healthy (e.g., wild-type) flies, with test agents that produce phenoprofiles more similar to the reference phenoprofile being ranked higher than test agents that produce phenoprofiles less similar to the reference phenoprofile and/or (2) comparing the phenoprofiles of the test populations with a reference phenoprofile of a test animal (i.e., exhibiting traits of the neurodegenerative condition), with test agents that produce phenoprofiles less similar to the reference phenoprofile being ranked higher than test agents that produce phenoprofiles more similar to the reference phenoprofile. Thus, in some embodiments, comparison of an agent phenoprofile to a reference phenoprofile is used to select an agent that results in a desired activity, such as ability to produce an agent phenoprofile that is similar to a phenoprofile of a healthy (e.g., wild-type) animal.

In one embodiment, the test animals are transgenic flies expressing a transgene whose expression results, indirectly or directly, in the neurodegenerative condition in the animal. Examples of such transgenes are genes encoding for a polypeptide with an expanded polyglutamine tract as compared to the, wild-type polypeptide, such as genes whose expression results in or contributes to Huntington's Disease, spinocerebellar ataxia type 1 (SCA1), SCA2, SCA3, SCA6, SCA7, SCA17, spinobulbar muscular atrophy, dentatorubropallidolusyan atrophy (DRPLA), and other diseases known in the art or to be discovered. In an embodiment, the reference phenoprofile is of a wild-type fly or a fly treated with an agent known to ameliorate the disease condition when administered to mammals with the disease. In one embodiment the reference phenoprofile is of a fly treated with a agent known to reduce the manifestation of at least one trait associated with expression of the transgene.

It will be appreciated that many other types of comparisons are possible depending on the specific aims of the screen. For example, the agent phenoprofiles can be compared with each other or with a reference phenoprofile of an animal treated with an specified agent whose biological activity is known or suspected.

In some instances, methods of the invention are used to determine whether an agent can delay onset of a phenotype of an animal, for example, a phenotype associated with a particular gene expression event, such as expression of a gene associated with a neurodegenerative disease. In such methods, the agent phenoprofile is determined at multiple times during development of the animal. Comparison of the agent phenoprofile and the reference phenoprofile at the various time points is used to determine whether contact with the agent delays onset of the phenotype.

It will be appreciated that "comparison" of phenoprofiles does not imply that the compared phenoprofiles were necessarily produced at the same time. For example, a reference phenoprofile can be generated and stored (in electronic form) at one time and agent phenoprofiles generated at different times can be compared to the reference phenoprofile. Conveniently, traits (e.g., fly movement) can be recalled from the recorded movies. Thus, traits (e.g., movement) of each population can be measured multiple times and, if desired, can be conducted many times over the course of the life span (e.g., adult life span) of the flies.

For example, in one aspect the invention provides a method for determining whether a test agent delays onset of a phenotype in a transgenic fly by providing population of transgenic flies, wherein the population develops a phenotype due to expression of a transgene (e.g., an adult onset disorder, contacting the flies with test agents, and determining an agent phenoprofile for the population in at a plurality of times during the life of the fly. The agent phenoprofile generated at each of the times is compared to a reference phenoprofile generated at corresponding times in a reference population (e.g., transgenic flies not contacted with the test agent), and it is determined whether the test agent delays onset of a phenotype in a population contacted with a test agent compared to the reference population.

Phenoprint

In a related aspect, the invention provides a method for identifying a defined set of traits (called a "phenoprint") that distinguish one population from a second population. This aspect of the invention can best be described by reference to a particular example, i.e., a set of traits that distinguishes a *Drosophila* population consisting of fly models of neurodegenerative diseases (i.e., flies transgenic for genes or gene fragments associated with Parkinson's disease, Huntington's disease and SCA1, for example) and a *Drosophila* population consisting of healthy flies (i.e., a wild-type, non-transgenic fly). It is believed that for two such populations (as well as for other combinations of populations) there will be some traits (movement, morphological or behavioral) for which the populations will differ significantly and some traits for which they will not differ. A useful phenoprint consists of traits that do differ, e.g., significantly (i.e., p≦0.05). By way of illustration, a phenoprofile for a *Drosophila* polyglutamine transgenic fly could be, for example, "x-only speed of 5, stumbling of 1000, path length of 98, and turning of 3." A phenoprint for a particular pair of populations can be determined by comparing traits of each population and identifying or selecting traits that differ most (or significantly) between the two populations.

TABLE 2

| Trait measured | Reference Population Phenoprofile (wild-type fly) | Test Population Phenoprofile (huntington disease transgenic fly) | Reference Population Phenoprint |
|---|---|---|---|
| x-only speed | 6 | 5 | |
| stumbling | 10 | 1000 | 10 |
| path length | 100 | 98 | |
| turning | 66 | 3 | 66 |
| X only distance | 1000 | 998 | |
| average Y-only speed | 20 | 500 | 20 |
| average speed | 20 | 18 | |
| acceleration | 50 | 60 | |

Identification of phenoprints that characterize a particular disease model will be useful, for example, for identifying sensitive and appropriate parameters of motor performance for automated screening for agents that can alter the disease-associated behavior phenotype, in particular, for agents that correct a behavior phenotype toward a wild-type animal behavior phenotype or for agents that delay development of a phenotype associated with a particular disease gene expression event. For example, with reference to Table 2, an exemplary assay could use huntington disease transgenic flies as test animals and screen test agents for the ability to modify the stumbling, turning, and average Y-only speed in a test population to a value close to (or closer to) the reference population phenoprint.

A phenoprint determined at a particular time can be compared to a phenoprint determined at a different time and the rate of change in a phenoprint over time, if any, can be determined. Accordingly, the rate of change of a phenoprint for a particular pair of populations can be determined by comparing phenoprints over time of each population.

It will be apparent to the careful reader that a "phenoprint" is a type of "phenoprofile," and that any comparison, ranking, etc., that can be carried out using phenoprofiles (such as described herein) can be carried out using phenoprints.

Test Agents

As noted above, the agent phenoprofile corresponding to a particular test agent can be used to determine the biological activity of the agent. Alternatively, when the biological activity of an agent is known or suspected, the agent can be used to determine the agent phenoprofile. It will be appreciated that, although the term "test agent" is used to describe the agents, the activity of the agent can be known or unknown.

Agents to be screened can be naturally occurring or synthetic molecules. Agents can be obtained from natural sources, such as, e.g., marine microorganisms, algae, plants, fungi, etc. Agents can include, e.g., pharmaceuticals, therapeutics, environmental, agricultural, or industrial agents, pollutants, cosmeceuticals, drugs, organic compounds, lipids, fatty acids, steroids, glucocorticoids, antibiotics, peptides, proteins, sugars, carbohydrates, chimeric molecules, purines, pyrimidines, derivatives, structural analogs or combinations thereof.

Usually, collections of compounds (known as libraries) are used. Libraries of natural compounds in the form of bacterial, fungal, plant and animal extracts are available or readily produced. Alternatively, agents to be assayed can be from combinatorial libraries of agents, including peptides or small molecules, or from existing repertories of chemical compounds synthesized in industry, e.g., by the chemical, pharmaceutical, environmental, agricultural, marine, drug, and biotechnological industries. Preparation of combinatorial chemical libraries is well known to those of skill in the art. Compounds that can be synthesized for combinatorial libraries include polypeptides, proteins, nucleic acids, beta-turn mimetics, polysaccharides, phospholipids, hormones, prostaglandins, steroids, aromatic compounds, heterocyclic compounds, benzodiazepines, oligomeric N-substituted glycines and oligocarbamates. Devices for the preparation of combinatorial libraries are commercially available (see, e.g., 357 MPS, 390 MPS, Advanced Chem Tech, Louisville, Ky., Symphony, Rainin, Woburn, Mass., 433A Applied Biosystems, Foster City, Calif., 9050 Plus, Millipore, Bedford, Mass.). Compounds to be screened can also be obtained from governmental or private sources, including, for example, the National Cancer Institute's (NCI) Natural Product Repository, Bethesda, Md.; the NCI Open Synthetic Compound Collection, Bethesda, Md.; NCI's Developmental Therapeutics Program; ComGenex, Princeton, N.J.; Tripos, Inc., St. Louis, Mo.; 3D Pharmaceuticals, Exton, Pa.; and Martek Biosciences, Columbia, Md.

For example, two companies sell libraries of known bioactive or FDA-approved drugs which may be used in methods of the invention. MicroSource Discovery Systems, Inc. (Gaylordsville, Conn.) provides a Gen-Plus™ collection of 960 known bioactive compounds, which contains significant overlap with the National Institute for Neurological Disorders and Stroke (NINDS) compound collection selected for the NINDS screening study. This set permits the simultaneous evaluation of hundreds of marketed drugs and biochemical standards. Prestwick Chemical (Washington, D.C.) sells a library containing a collection of 640 high-purity chemical compounds the majority of which are off-patent marketed drugs.

Additionally, natural or synthetically produced libraries and compounds are readily modified through conventional chemical, physical and biochemical means, and may be used to produce combinatorial libraries.

Screening may also be directed to known pharmacologically active compounds and analogs thereof. Known pharmacological agents may be subjected to directed or random chemical modifications, such as acylation, coalkylation, esterification, amidification, etc. to produce structural analogs. New potential test agents may also be created using methods such as rational drug design or computer modeling.

As described above, compounds that may be assayed according to the methods of the invention encompass numerous chemical classes. For example, organic molecules, preferably small organic compounds having a molecular weight of more than 50 and less than about 2,500 daltons, are a type of compound for use in the methods of the invention.

One exemplary library for use in methods of the invention includes compounds based on 2,5-diketopiperazine (DKP) scaffold. Generally, compounds of this library are biased toward particular amines, exhibit stability to proteolysis, have a molecular weight range of about 250 to about 450 daltons and have solubilities greater than about 5 mM. Another exemplary library for use in methods of the invention includes trimer pseudopeptides (or peptoids). Generally, such libraries are composed of a large number of compounds (e.g., over 10,000 compounds) distributed in pools of individual peptoids and the peptoids exhibit proteolytic stability. Trimer pseudopeptide libraries have been used in the identification and development of lead compounds, such as G-protein coupled receptor antagonists (see, for example, Blaker et al. (2000) Mol. Pharmacol. 58:399-406; Gao et al. (1999) Curr. Med. Chem. 6:375-388).

The compounds identified through screening in one or more assays, as described herein, can serve as conventional "lead compounds" or can themselves be used as potential or actual therapeutics.

Contacting Insects with Agents

In the methods of the subject invention, each compound composition is brought into contact with the population of animals in a manner such that the active agent of the compound composition is capable of exerting activity on at least a substantial portion of, if not all of, the individual animals of the population. By substantial portion is meant at least 75%, usually at least 80% and in many embodiments can be as high as 90 or 95% or higher. Generally, the members of the population are contacted with each compound test agent in a manner such that the active agent of the composition is internalized by the animals. In some cases, internalization will be by ingestion, i.e. orally, such that that each compound composition will generally be contacted with the plurality of animals by incorporating the compound composition in a nutrient medium, e.g. water, yeast paste, aqueous solution of additional nutrient agents, etc., of the animals. For example, the candidate agent is generally orally administered to the fly by mixing the agent into the fly nutrient medium, such as a yeast paste, and placing the medium in the presence of the fly (either the larva or adult fly) such that the fly feeds on the medium. In some cases, members of a population are contacted with a compound by exposing the population to the compound in the atmosphere, including vaporization or aerosol delivery of the compound, or spraying a liquid containing the compound onto the animals. In some cases, members of the population (e.g., larval animals) are injected with the compound.

The compound composition may be contacted with the population of animals at any convenient stages during the life cycle of the animal. Thus, depending on the particular animals employed, the compound composition is contacted with the animals during an immature life cycle stage, e.g. prelarval stage or larval stage, or alternatively during an adult stage, or at multiple times. Animal contact with the composition may occur once or many times and administration of the compound may in an acute or a chronic mode.

In some instances, a plurality of assay mixtures are run in parallel with different agent concentrations to obtain a differential response to the various concentrations of test agent. Typically, one of these concentrations serves as a negative control, i.e., no test agent.

Pharmaceutical Compositions

The invention further provides for (i) the use of agents identified by the above-described screening assays for treatment of disease in mammal, e.g., humans, (ii) pharmaceutical compositions comprising an agent identified by the above-described screening assay and (iii) methods for treating a mammal, e.g., human, with a disease by administering an agent identified by the above-described screening assays. In one embodiment, the invention provides a method of preparing a medicament for use in treatment of a disease in mammals by (a) providing a population of flies with characteristics of a mammalian disease (b) using a method described herein to identify an agent expected to ameliorate the disease phenotype (e.g., an agent with an agent phenoprofile that is similar to a phenoprofile of a population of flies with a healthy phenotype) and (c) formulating the agent for administration to a mammal. In some cases, the phenotype of the population of flies in step (a) may be characteristic of a mammalian neurodegenerative disease. The population of flies in step (a) may be transgenic flies and, in some cases, the expression of the transgene may result in neurodegeneration or a phenotype of a neurodegenerative disease. Genes and transgenes associated with mammalian neurodegenerative diseases and flies containing such transgenes are described herein.

In one aspect, a method of preparing a medicament for use in treating a disease is provided, comprising formulating the agent for administration to a mammal, e.g., primate. For example, suitable formulations may be sterile and/or substantially isotonic and/or in full compliance with all Good Manufacturing Practice (GMP) regulations of the U.S. Food and Drug Administration and/or in a unit dosage form. See, Remington's *Pharmaceutical Sciences* (17th ed.) Mack Publishing Co., Easton, Pa.; Avis et al (eds.) (1993).

EXAMPLES

Example 1

High Throughput Screening of Compounds Using a Fly Neurodegeneration Model

A library of compounds is screened for activity in an animal model system for neurodegeneration. The test animals are transgenic *Drosophila melanogaster* which express a human polypeptide associated with SCA1, ataxin-1, in all neurons. These animals, designated $SCA1^{82Q}$, are generated using the GAL4/UAS system to express the transgene which encodes full-length ataxin-1 82Q, an isoform of ataxin-1 with an expanded glutamine repeat (Fernandez-Funez et al. (2000)). $SCA1^{82Q}$ flies demonstrate impaired motor performance in which they appear to lose balance, e.g., fall on their backs and have difficulty righting themselves. This impaired motor function is adult in onset and progresses over time.

In the screening assay, a population of animals, about 10-20 flies, are in optically transparent vials. Test compounds are administered to test populations by adding the test compound to a yeast paste and the yeast paste is added to the vial. The library of test compounds consists of compounds based on 2,5-diketopiperazine (DKP), is biased toward particular amines and has molecular weights generally ranging from 250-400 g/mol, as described in Szardenings et al. (1998) J. Med. Chem. 41:2194-2200. Test compounds are administered at three concentrations (approximately 0.1, 1.0 and 10 micrograms per vial) for 12 days of treatment. Two reference populations of animals in the assay are SCA182Q flies receiving no test compound ("negative reference phenoprofile") and wild-type flies ("positive reference phenoprofile").

Using an automated motion tracking system described herein, movement of the files in the test populations and the reference populations are imaged and analyzed. In the assay, after the flies are gently tapped to the bottom, the motor activity of the flies in each population is captured in 20-50 consecutive frames using a CCD-video camera. In analysis of each frame, algorithms identify each fly as an oval, define its center and record the polar vector of the oval. Trajectories of the flies in a population are then analyzed on the basis of defined parameters, including variables such as, average speed, vertical-only speed, vertical distance, frequency of turning, trajectory count, average object size, and the variance about the mean trajectory (which identifies "stumbling" behavior). Results of these parameters are stored and assays of the populations are performed multiple times over the course of the adult life span of the flies.

Multivariate analysis is used to compare parameter results from the test populations of animals and from the reference populations and the analysis is used to define a phenoprofile associated with an test compound, i.e., agent phenoprofile and to define the reference phenoprofiles. A comparison of the agent phenoprofile to the reference phenoprofile is used to identify test compounds with activity in the test animals. Agents producing agent phenoprofiles similar to the positive reference phenoprofile and/or dissimilar to the negative reference profile are candidates for treatment of spinocerebellar ataxia in mammals.

Example 2

Motion Tracking with Wild-Type Flies

Figure 19:
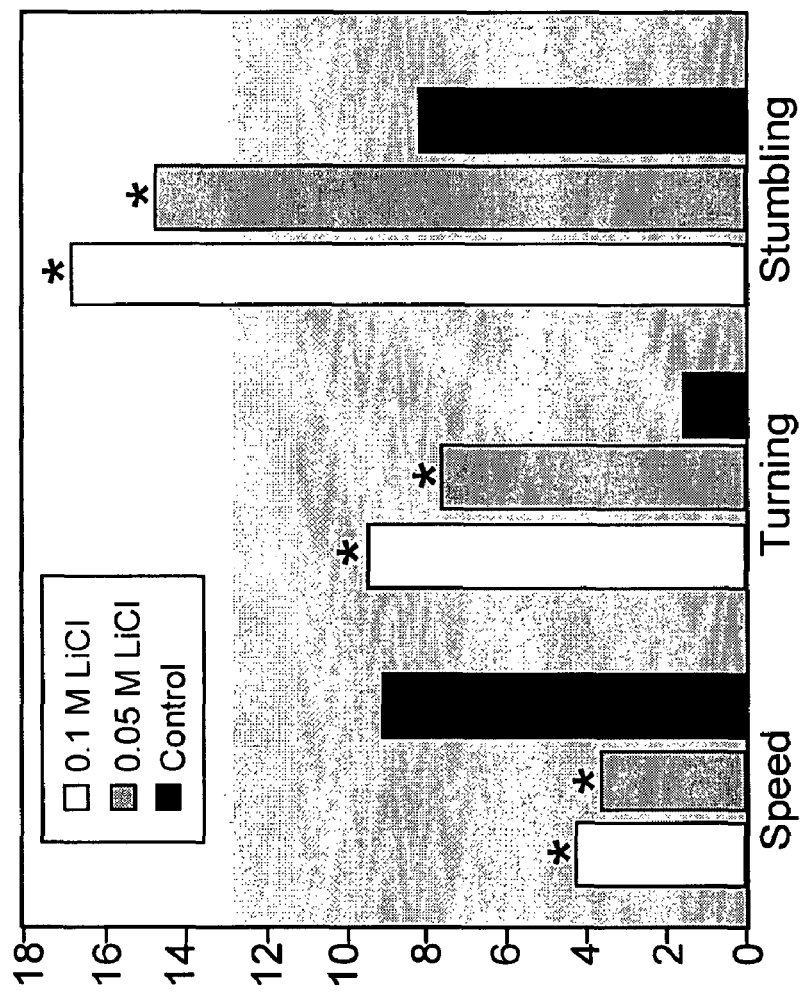
FIG. 19 is a bar graph from Example 2 showing the results of an assay of treated and control flies.

Several sets of wild-type flies were assayed under various conditions to test the motion tracking software. Lithium Chloride (LiCl), a treatment for bipolar affective disorder in humans, is also known to induce behavioral changes in *Drosophila* (Xia et al., 1997). In this assay, flies fed 0.1M or 0.05M LiCi exhibited a significant reduction in speed and an increased incidence of turning and stumbling compared to controls. The results of this assay are shown in the bar graph of FIG. 19.

Example 3

Motion Tracking with *Drosophila* Model of Huntington Disease

*Drosophila* expressing a mutant form of human Huntington (HD) have a functional deficit that is quantifiable, reproducible, and is suitable for automated high-throughput screening. *Drosophila* (or specimen) movements can be analyzed for various characteristics and/or traits. For example, statistics on the movements of the specimens, such as the x and y travel distance, path length, speed, turning, and stumbling, can be calculated. These statistics can be averaged for a population and plotted.

Figure 20:
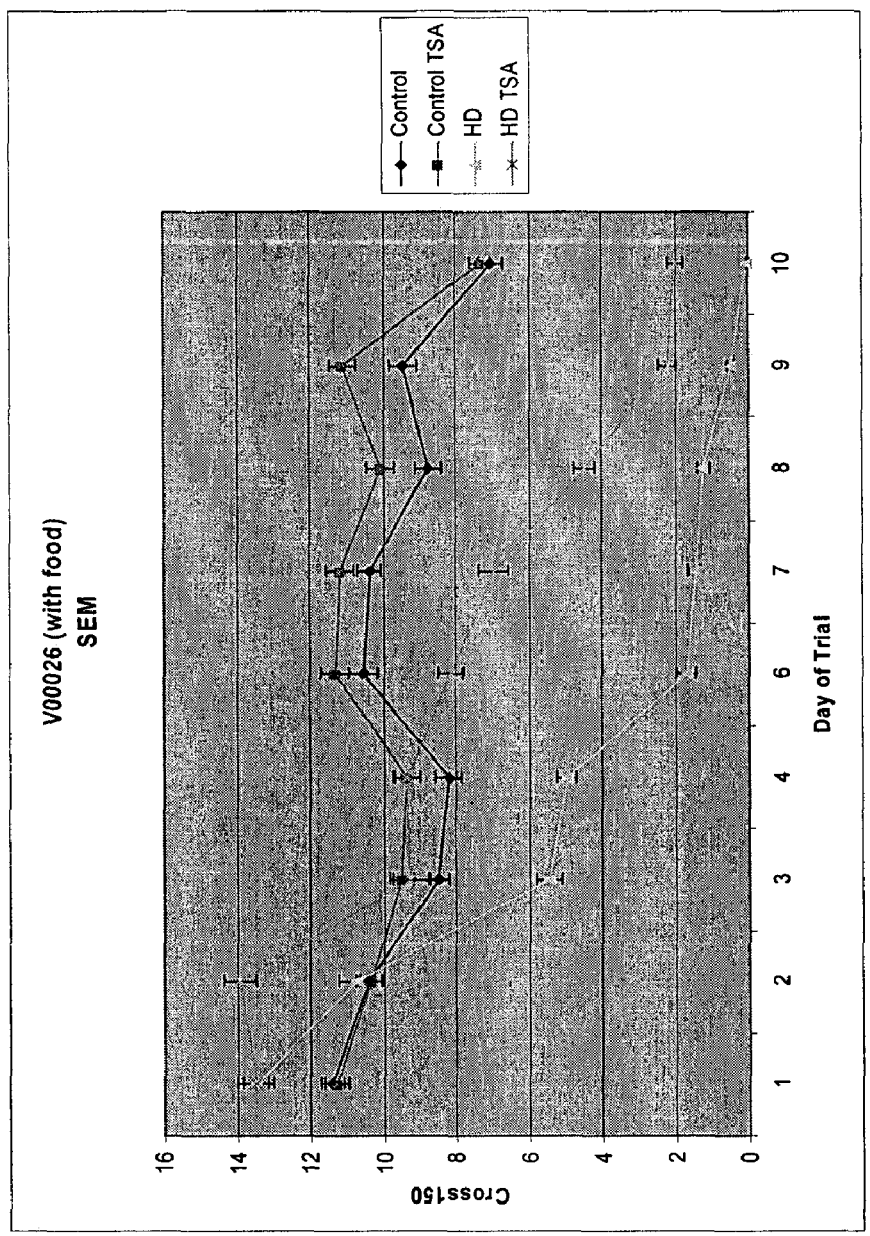
FIG. 20 is a line graph from Example 3 showing motor performance, assessed by the Cross150 score (y-axis) plotted against time x-axis)

Differences between the HD model+/−drug (HDAC inhibitor, TSA) and wild type (control)+/−drug (TSA) can clearly be detected using the motion tracking software. Progressive motor dysfunction and therapeutic treatment with drug can be measured by various scoring parameters. Such results are shown in FIG. 20. In FIG. 20, motor performance, assessed by the Cross150 score, is plotted on the y-axis against time (x-axis). The Cross150 score, or x travel distance, is equal to the number of trajectories (specimens) that cross a position at x=150 in the negative x-direction (from bottom to top of the vial) during the movie. In other words, this score measures the number of detected flies that climb above the x=150 line within the length of the movie. This graph demonstrates the potential therapeutic effect of drug (TSA) on the HD model. Error bars are +/−SEM). Control genotype is yw/elavGAL4. HD genotype is HD/elavGAL4.

Figure 21B:
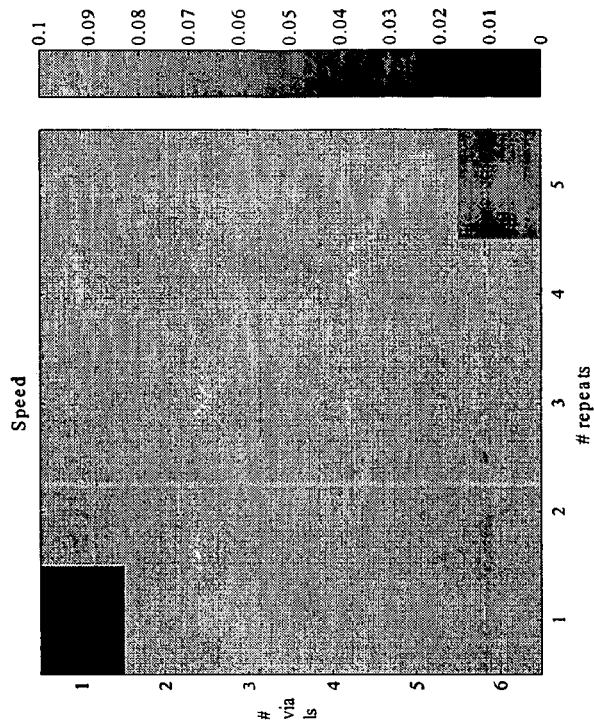
FIGS. 21A-21J from Example 3 are ten plots showing the average p-values for different populations for each combination of a certain number of video repeats and replica vials.
Figure 21A:
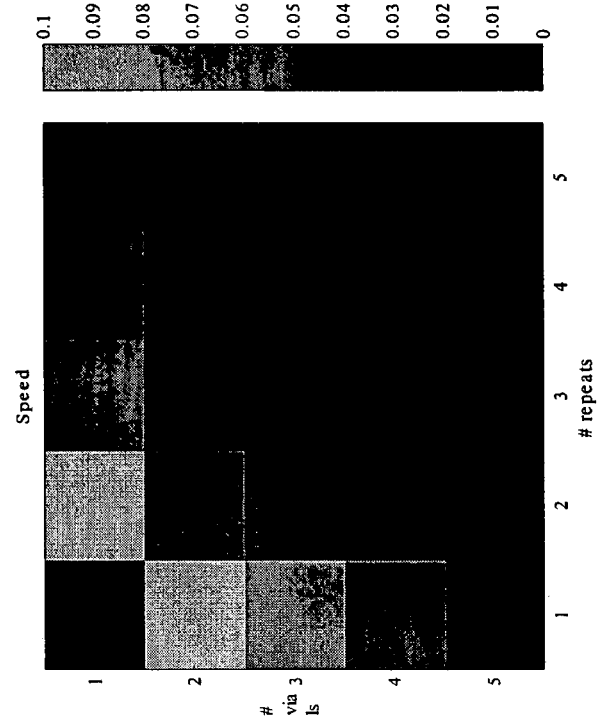
Figure 21D:
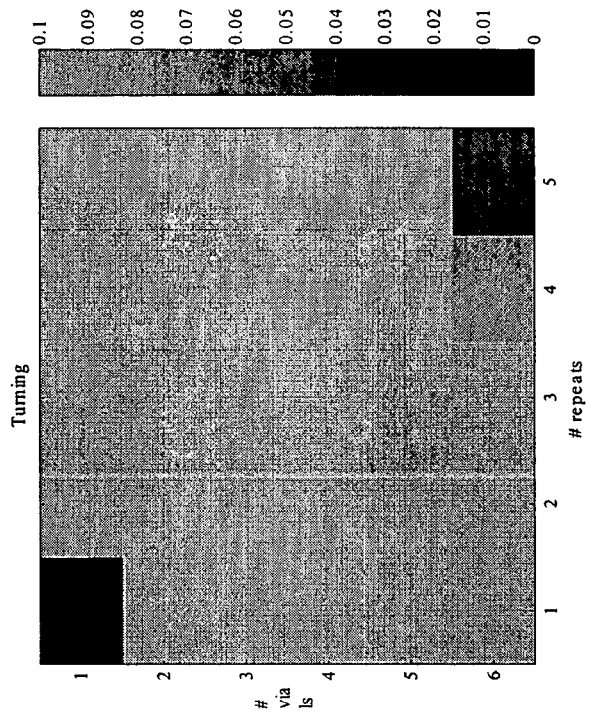
Figure 21C:
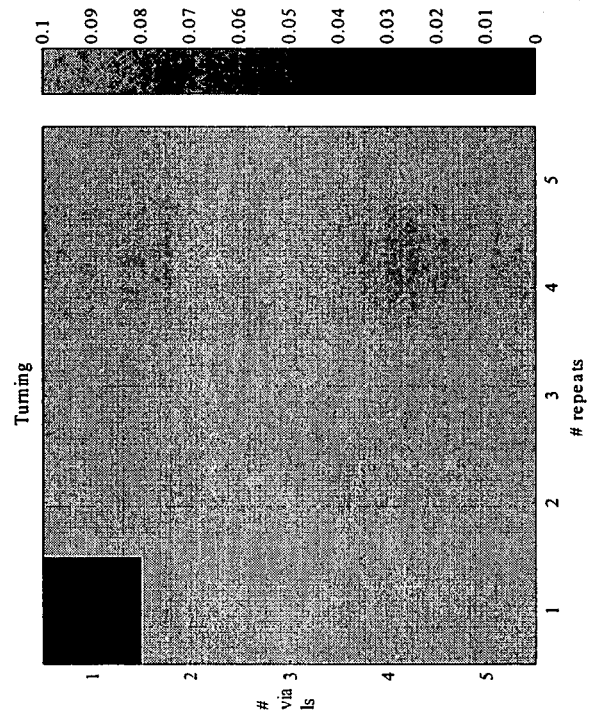
Figure 21F:
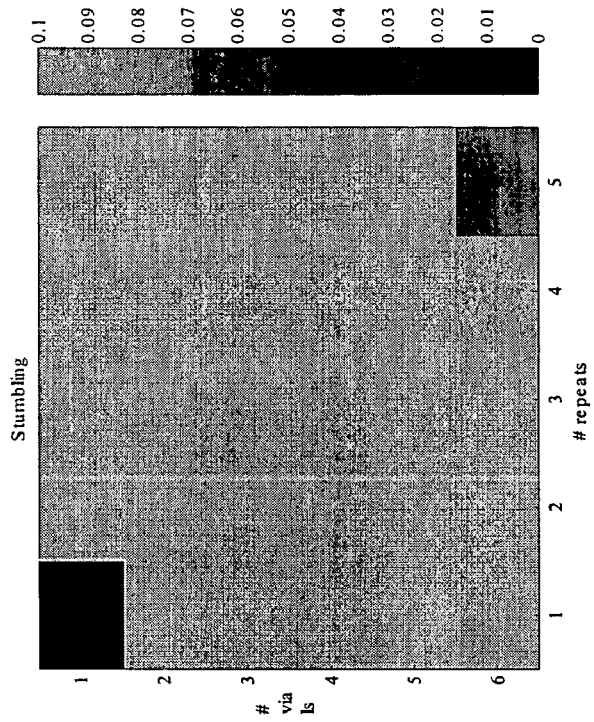
Figure 21E:
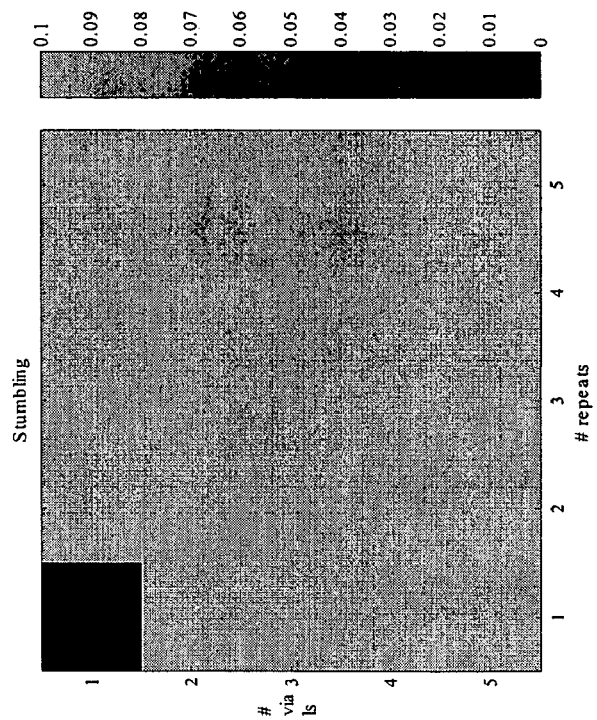
Figures 21G, 21H:
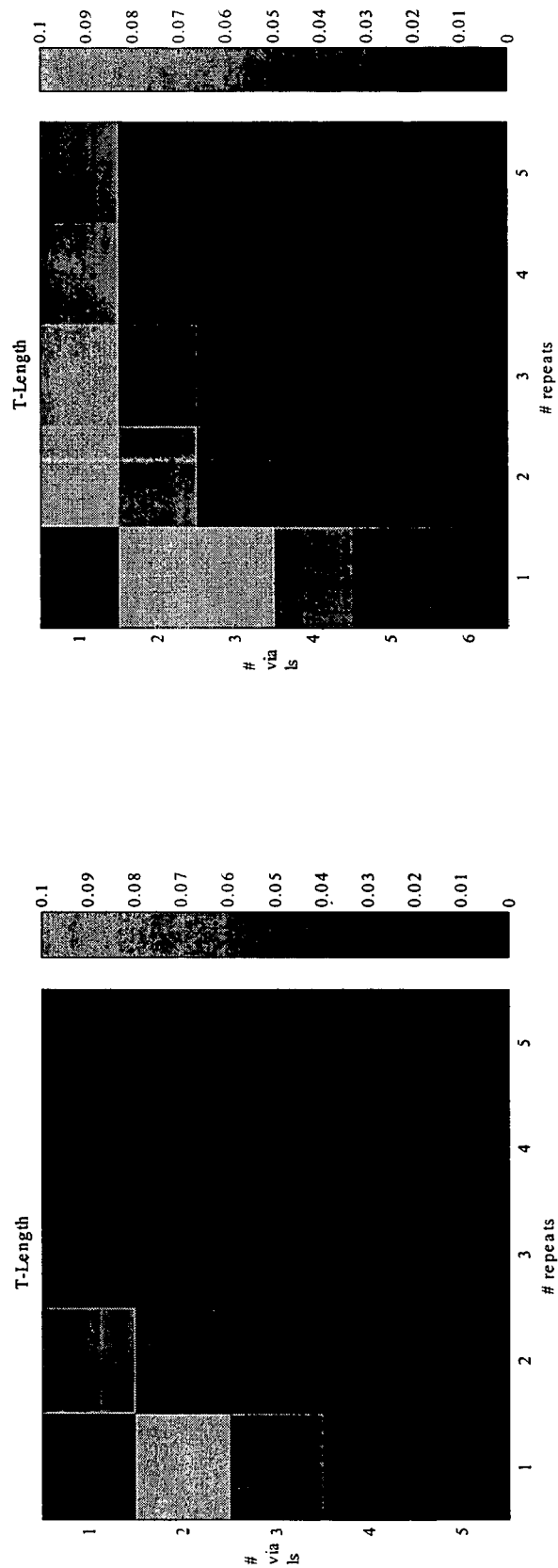
Figure 21J:
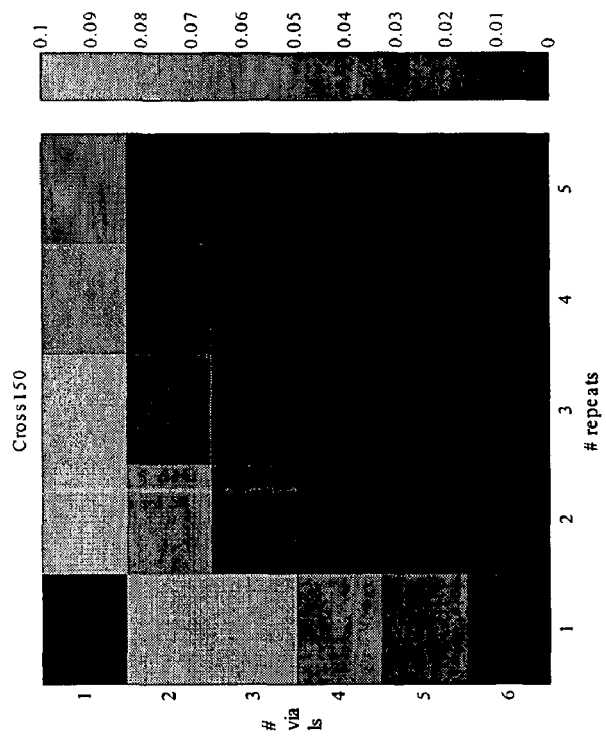
Figure 21I:
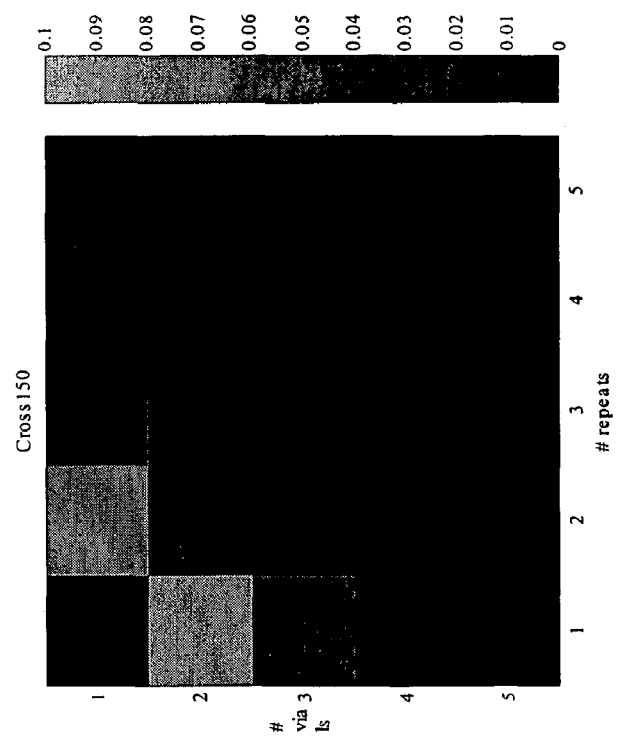

Movement characteristics of different models, or the effects of certain drugs on those models, will be distinct. FIGS. 21A-21J demonstrate (1) how well various scores define the differences between disease model and wild-type control, (2) how well the various scores detect improvements+/−drug treatment, and (3) how many replica vials and repeat videos are needed for statistically significant results. In FIGS. 21A-21J, the average p-values for each combination of a certain number of video repeats and replica vials for Test and Reference populations are shown. Lower-values are indicated by darker coloring. The lower the p-value, the more likely the score represents a significant difference between Test and Reference populations. In FIGS. 21A, 21C, 21E, 21G, and 21I, the Reference population is wild-type control and the Test population is the HD model. In FIGS. 21B, 21D, 21F, 21H, and 21J, the Reference population is HD model without drug and the Test population is the HD model with drug (TSA). Speed is shown in FIGS. 21A and 21B, turning is shown in FIGS. 21C and 21D, stumbling is shown in FIGS. 21E and 21F, T-length is shown in FIGS. 21G and 21H, and Cross 150 is shown in FIGS. 21I and 21J.

In FIGS. 21A, 21G and 21I, Speed, T-Length, and Cross150 scores are very useful for identifying HD flies from wild-type control flies—the p-value goes down when either number of replica vials or number of repeat videos are increased, which is to be expected. Turning and Stumbling scores do not appear do give significant values not even for large number of replica vials or videos repeats. In FIGS. 21B, 21D and 21F, the scores for Speed, Turning, and Stumbling do not yield significant values. The scores that best highlight the therapeutic effect of the drug in the HD model are T-Length (FIGS. 21G and 21H) and Cross150 (FIGS. 21I and 21J). Note the striking differences between the Speed plots (FIGS. 21A and 21B). Speed is a useful score for telling apart HD flies from wild type flies, however it does not appear to be effective for telling apart HD untreated flies from HD with drug flies. Although the drug seems to restore climbing ability for HD flies to almost the same level as for wt flies, the same is not true for speed.

Example 4

Motion Tracking with *Drosophila* Model of Spinocerebellar Ataxia Type 1

Figure 22:
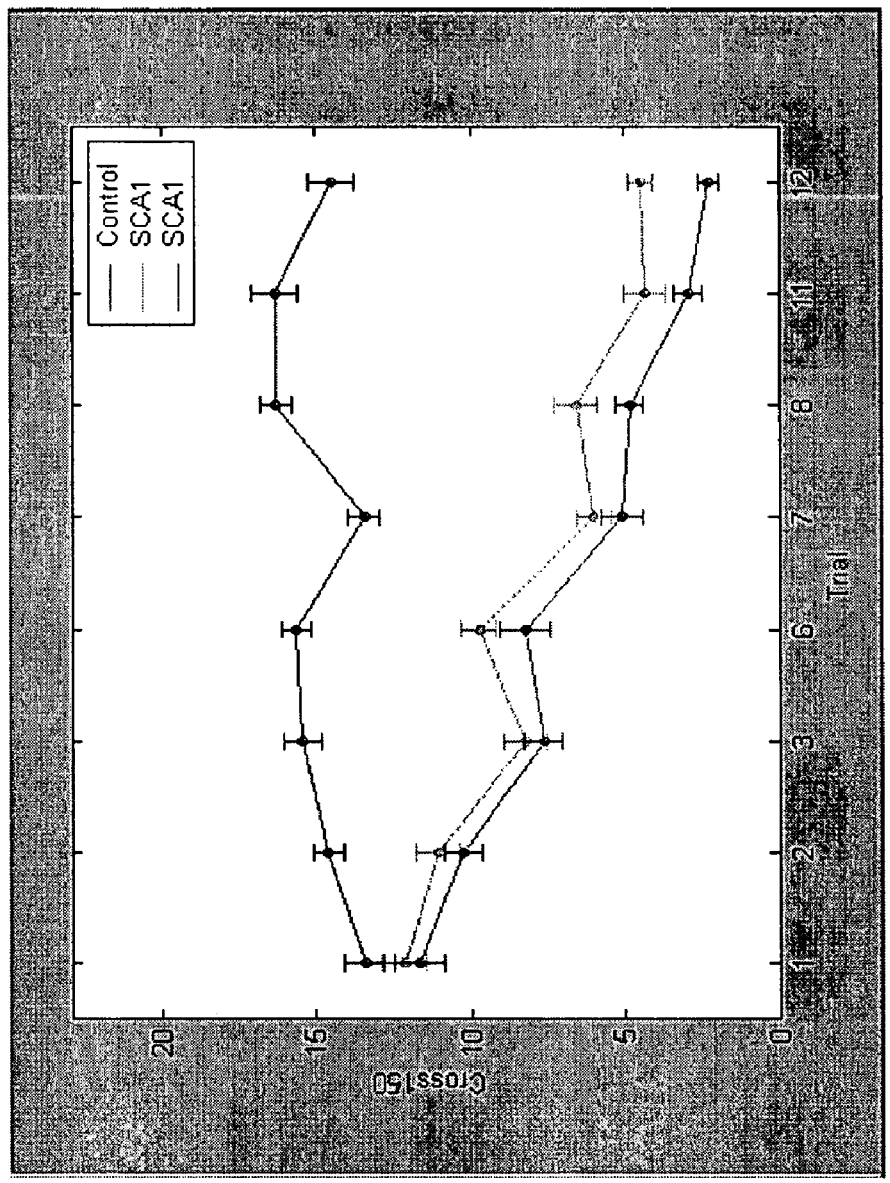
FIG. 22 from Example 4 is a line graph showing motor performance on the y-axis (Cross150) plotted against time on the x-axis (Trials).

FIG. 22 shows the loss of motor performance in the SCA1 *Drosophila* model. SCA1 model and control trials were analyzed and plotted by Phenoscreen software. Motor performance on the y-axis (Cross150) is plotted against time on the x-axis (Trials). SCA1 model is indistinguishable from controls on first day of adult life then they decline progressively in climbing ability. The error bars are +/−SEM. Control fly genotype is yw/nirvanaGAL4. SCA1 fly genotype is SCA1/nirvanaGAL4.

The invention claimed is:

1. A method for determining whether at least one test agent has an effect on a population of insects comprising;
   providing a population of transgenic insects, wherein each of said transgenic insects of said population comprises a human neurodegenerative disease gene;
   identifying a trait of a specimen in the population before the administration of said at least one test agent;
   administering said at least one test agent to said population;
   creating a plurality of digital frames of a movie showing said trait of specimens in the population; and
   identifying a difference between said trait before administration of said at least one test agent and after administration of said at least one test agent, wherein a difference identifies said at least one test agent as having an effect on said population of insects.

2. The method of claim 1 further comprising the step of quantifying at least one trait of said population shown in said plurality of digital frames.

3. The method of claim 1 further comprising the steps of:
   determining an agent phenoprofile for said population, wherein the agent phenoprofile comprises a quantitative description of one or more traits exhibited by insects in said population;
   comparing the agent phenoprofile to a reference phenoprofile, wherein the reference phenoprofile comprises a quantitative description of said one or more traits exhibited by insects in a reference population; and
   selecting an agent that results in said agent phenoprofile being more similar or less similar to said reference phenoprofile.

4. The method of claim 3 wherein said trait is selected from the group consisting of total distance traveled over a defined period of time, distance traveled in X direction over a defined period of time; distance traveled in Y direction over a defined period of time; total distance moved per time unit; distance moved in X direction per time unit; distance moved in Y direction per time unit); the rate of change of velocity per time unit, turning, stumbling, spatial position, and path shape.

5. The method of claim 3 wherein said step of determining comprises measuring data selected from the group consisting of X-pos, X-speed, speed, turning, stumbling, size, T-count, P-count, T-length, Cross150, Cross250, and F-count.

6. The method of claim 3 wherein said trait is selected from the group consisting of movement of one insect toward or away from another insect, occurrence of no relative spatial displacement of two insects, occurrence of two insects within a defined distance from each other, and occurrence of two insects more than a defined distance away from each other.

7. The method of claim 3, wherein said trait is a morphological trait.

8. The method of claim 3, wherein said population of insects has a phenotype with characteristics of a mammalian disease.

9. The method of claim 1, wherein said step of identifying a trait comprises identifying more than one trait.

10. The method of claim 9, wherein said more than one trait defines a phenoprint.

11. The method of claim 1, wherein said population is a population of transgenic insects which develops a phenotype due to expression of said transgene, the method further comprising the steps of:
    determining an agent phenoprofile for the population at a plurality of times during the life of the insect;
    comparing the agent phenoprofile generated at each of the plurality of times to a reference phenoprofile generated at each of the plurality of times for a reference population, wherein the reference population consists of insects not contacted with said test agent; and
    determining whether said test agent modifies, delays or prevents onset of a trait of said agent phenoprofile in said population contacted with a test agent compared to said reference population.

12. The method of claim 11 or 8 wherein said trait is selected from the group consisting of total distance traveled over a defined period of time, distance traveled in X direction over a defined period of time; distance traveled in Y direction over a defined period of time; total distance moved per time unit; distance moved in X direction per time unit; distance moved in Y direction per time unit); the rate of change of velocity per time unit, turning, stumbling, spatial position, and path shape.

13. The method of claim 11 or 8 wherein said step of determining comprises measuring data selected from the group consisting of X-pos, X-speed, speed, turning, stumbling, size, T-count, P-count, T-length, Cross150, Cross250, and F-count.

14. The method of claim 11 or 8 wherein said trait is selected from the group consisting of movement of one insect toward or away from another insect, occurrence of no relative spatial displacement of two insects, occurrence of two insects within a defined distance from each other, and occurrence of two insects more than a defined distance away from each other.

15. The method of claim 11 or 8, wherein said trait is a morphological trait.

16. A method for determining whether at least one test agent has an effect on a population of insects comprising:
  providing a plurality of populations of transgenic insects, wherein each of said transgenic insects of said population comprises a human neurodegenerative disease gene;
  identifying at least two traits of a specimen in each of said populations before the administration of said at least one test agent
  administering said at least one test agent to each of said populations;
  creating a plurality of digital frames of a movie showing said at least two traits of specimens in each population;
  for each population identifying a difference between said at least two traits before administration of said at least one test agent and after administration of said at least one test agent, wherein a difference identifies said agent as having an effect on said population of insects.

17. The method of claim 16 further comprising the step of quantifying at least two traits of each population shown in said plurality of digital frames.

18. The method of claim 16, wherein each population of said plurality of populations is contacted, each with a different test agent; the method further comprising the steps of:
  generating an agent phenoprofile for each population, said agent phenoprofile comprising a quantitative description of said trait or said at least two traits exhibited by transgenic insects in each population;
  comparing said agent phenoprofile to a reference phenoprofile defined by said trait or said at least two traits that is measured in a reference population of insects; and
  ranking said test agents according to the similarity or difference of each agent phenoprofile with said reference phenoprofile.

19. The method of claim 16, wherein each population of said plurality of populations is contacted, each with a different test agent, the method further comprising the steps of:
  determining an agent phenoprofile for each of said populations, wherein the agent phenoprofile comprises a quantitative description of one or more traits exhibited by insects in the population;
  comparing the agent phenoprofile to a reference phenoprofile, wherein the reference phenoprofile comprises a quantitative description of said one or more traits exhibited by insects in a reference population; and
  selecting an agent that results in a change in said agent phenoprofile relative being more similar or less similar to said reference phenoprofile.

20. The method of claim 18 or 19 wherein said trait is selected from the group consisting of total distance traveled over a defined period of time, distance traveled in X direction over a defined period of time; distance traveled in Y direction over a defined period of time; total distance moved per time unit; distance moved in X direction per time unit; distance moved in Y direction per time unit); the rate of change of velocity per time unit, turning, stumbling, spatial position, and path shape.

21. The method of claim 18 or 19 wherein said trait is selected from the group consisting of movement of one insect toward or away from another insect, occurrence of no relative spatial displacement of two insects, occurrence of two insects within a defined distance from each other, and occurrence of two insects more than a defined distance away from each other.

22. The method of claim 18 or 19 wherein said trait is a morphological trait.

23. The method of claim 19 wherein said step of determining comprises measuring data selected from the group consisting of X-pos, X-speed, speed, turning, stumbling, size, T-count, P-count, T-length, Cross150, Cross250, and F-count.

24. The method of claim 1 or 16 wherein said trait or each of said at least two traits is selected from the group consisting of total distance traveled over a defined period of time, distance traveled in X direction over a defined period of time; distance traveled in Y direction over a defined period of time; total distance moved per time unit; distance moved in X direction per time unit; distance moved in Y direction per time unit); the rate of change of velocity per time unit, turning, stumbling, spatial position, and path shape.

25. The method of claim 1 or 16 wherein said trait is selected from the group consisting of movement of one insect toward or away from another insect, occurrence of no relative spatial displacement of two insects, occurrence of two insects within a defined distance from each other, and occurrence of two insects more than a defined distance away from each other.

26. The method of claim 1 or 16, wherein said trait is a morphological trait.

27. The method of claim 1 or 16, wherein said insect is transgenic for a gene encoding a polypeptide with an expanded polyglutamine tract as compared to the wild-type polypeptide.

28. The method of claim 27, wherein the expression of the transgene results in neurodegeneration in said specimen.

29. The method of claim 1, 16, 18, 19, 3, 11, or 8 wherein said insect is a fly.

30. The method of claim 29, wherein said fly is *Drosophila*.

31. The method of claim 1, 16, 18, 19, 3, or 8 wherein said insect comprises a genetic mutation resulting in a loss of function or a gain of function.

32. The method of claim 18, 19, 3, 11, or 8, wherein said insect is a transgenic fly, and said reference population is selected from the group consisting of (i) transgenic flies not contacted with a test agent; (ii) transgenic flies contacted with an agent with a known activity on said flies; (iii) nontransgenic flies with the genetic background of the transgenic flies; or (iv) transgenic flies not expressing a disease gene and not contacted with a test agent.

33. The method of claim 18, 19, 3, 11, or 8, wherein said reference population is selected from the group consisting of (i) flies comprising a genetic mutation not contacted with a test agent; (ii) flies comprising a genetic mutation contacted with an agent with a known activity on said flies; or (iii) flies without the genetic mutation.

34. A method for determining an effect of at least one test agent on a population of insects comprising
  providing a population of transgenic insects;
  administering at least one test agent to said population;
  creating a plurality of digital frames of a movie showing two or more traits of specimens in the population;
  generating an agent phenoprofile comprising said two or more traits, and comparing said agent phenoprofile with a reference phenoprofile to generate a phenoprint; and identifying a difference between said phenoprint and a reference phenoprint, wherein a difference identifies said agent as having an effect on said population of insects.

35. The method of claim 2 or 17 wherein said step of quantifying comprises measuring data selected from the group consisting of X-pos, X-speed, speed, turning, stumbling, size, T-count, P-count, T-length, Cross150, Cross250, and F-count.

* * * * *